US011919667B2

(12) United States Patent
Takemura

(10) Patent No.: US 11,919,667 B2
(45) Date of Patent: Mar. 5, 2024

(54) SHEET STORAGE APPARATUS, AND SHEET HANDLING APPARATUS

(71) Applicant: GLORY LTD., Himeji (JP)

(72) Inventor: Yoichi Takemura, Hyogo (JP)

(73) Assignee: GLORY LTD., Himeji (JP)

(*) Notice: Subject to any disclaimer, the term of this patent is extended or adjusted under 35 U.S.C. 154(b) by 0 days.

(21) Appl. No.: 17/938,976

(22) Filed: Sep. 7, 2022

(65) Prior Publication Data

US 2023/0084676 A1 Mar. 16, 2023

(30) Foreign Application Priority Data

Sep. 16, 2021 (JP) ................................ 2021-151136

(51) Int. Cl.

| | |
|---|---|
| ***B65B 25/14*** | (2006.01) |
| ***B65B 57/14*** | (2006.01) |
| ***G07D 11/125*** | (2019.01) |
| ***G07D 11/235*** | (2019.01) |

(52) U.S. Cl.

CPC .............. *B65B 25/14* (2013.01); *B65B 57/14* (2013.01); *G07D 11/125* (2019.01); *G07D 11/235* (2019.01)

(58) Field of Classification Search

CPC ......... B65B 5/067; B65B 25/14; B65B 35/40; B65B 35/50; B65B 57/14; G07D 11/125; G07D 11/235; G07D 11/40; B65H 31/22; B65H 2405/311; B65H 2701/1912

USPC .......................................... 53/540, 542, 258

See application file for complete search history.

(56) References Cited

U.S. PATENT DOCUMENTS 8,579,278 B2 * 11/2013 Arikata et al. ......... G07D 11/40 271/9.12
9,114,952 B2 8/2015 Holland-Letz et al.
11,568,701 B2 * 1/2023 Miyake et al. ........ G07D 11/40
2010/0189379 A1 * 7/2010 Razzaboni et al. .. G07D 11/125 53/284.7
2012/0186199 A1 * 7/2012 Rao et al. .............. G07D 11/12 53/531
2014/0069768 A1 3/2014 Yokote
(Continued)

FOREIGN PATENT DOCUMENTS

EP 3832611 6/2021

OTHER PUBLICATIONS

Extended European Search Report for European Patent Application No. 22195646.9 dated Jan. 27, 2023.

*Primary Examiner* — Stephen F. Gerrity

(74) *Attorney, Agent, or Firm* — Amin, Turocy & Watson, LLP

(57) ABSTRACT

A sheet storage apparatus and a sheet handling apparatus that allow attaching or removing of a storage bag with a simple structure and less space are provided. The sheet storage apparatus of the present disclosure includes an attachment unit including an attachment portion to which a storage bag for sheets is attached, a moving unit that moves the sheets toward an inside of the storage bag, and a first slide unit that slides at least any one of the attachment unit and the moving unit such that a relative position between the attachment unit and the moving unit is changed between a first position in which the attachment portion is covered with the moving unit and a second position in which the attachment portion is exposed to allow attaching or removing of the storage bag.

13 Claims, 24 Drawing Sheets

(56) References Cited

U.S. PATENT DOCUMENTS

2017/0148247 A1* 5/2017 Shimizu et al. ..... G07D 11/125
2018/0170697 A1 6/2018 Okamoto et al.
2020/0027300 A1* 1/2020 Baydin et al. .......... B65B 35/50
2020/0320818 A1* 10/2020 Menot et al. ........... B65B 25/14
2022/0254214 A1* 8/2022 Watanabe et al. ..... G07D 11/40
2023/0073458 A1* 3/2023 Wallman-Carlsson et al. ............. G07D 11/125

* cited by examiner

SHEET STORAGE APPARATUS, AND SHEET HANDLING APPARATUS

TECHNICAL FIELD

The present disclosure relates to a sheet storage apparatus that stores sheets, and a sheet handling apparatus comprising a sheet storage apparatus.

BACKGROUND ART

There has been a widespread of sheet storage apparatuses that store sheets, such as securities and banknotes, in storage bags. For example, U.S. Pat. No. 9,114,952 describes an apparatus that feeds banknotes into a bag disposed in a horizontal orientation and stacks the banknotes in the bag in an upright position.

CITATION LIST

Patent Literature

PTL 1
U.S. Pat. No. 9,114,952

Summary

DESCRIPTION OF EMBODIMENTS

Figure 1:
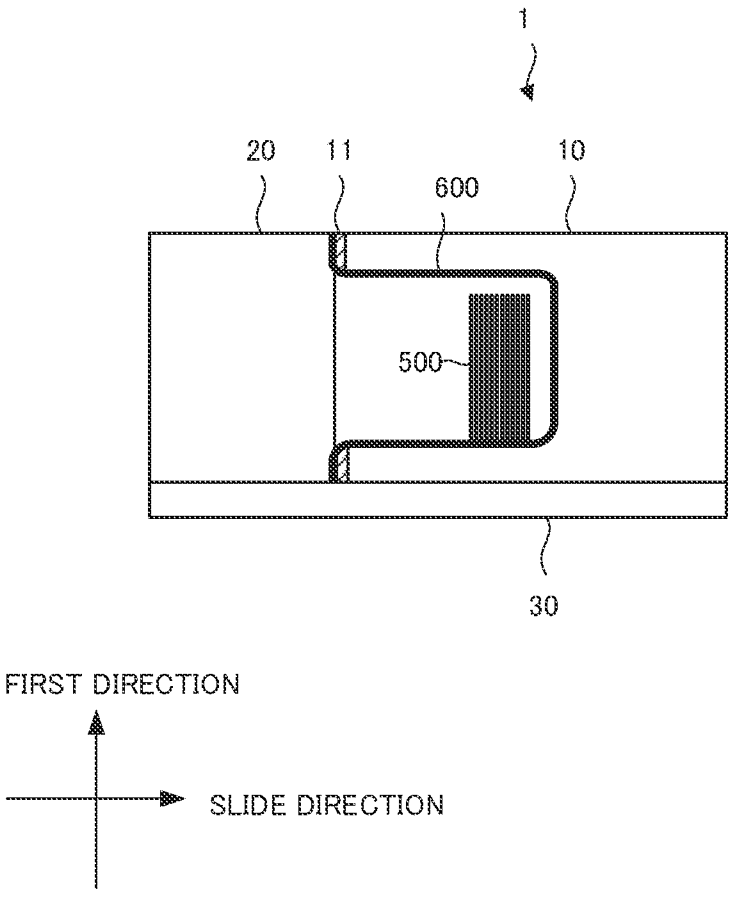
FIG. 1 is a diagram for illustrating components comprised by a sheet storage apparatus according to Embodiment 1 of the present disclosure.

PTL 1 describes a configuration that allows, after a retaining unit for retaining a bag is drawn out from a rack by way of a slide, rotation of the retaining unit with respect to the slide, in attaching or removing a bag. With such a configuration, a bag can be easily attached to or removed from the retaining unit.

However, with the technology described in U.S. Pat. No. 9,114,952, the retaining unit needs to be rotated with respect to the slide, so the structure is complicated, and space for rotating the retaining unit is needed.

The present disclosure provides a sheet storage apparatus and a sheet handling apparatus that allow the attaching or removing of a storage bag with a simple structure and less space.

A sheet storage apparatus according to an embodiment of the present disclosure comprises: an attachment unit comprising an attachment portion to which a storage bag for sheets is attached; a moving unit that moves the sheets toward an inside of the storage bag; and a first slide unit that slides at least any one of the attachment unit and the moving unit such that a relative position between the attachment unit and the moving unit is changed between a first position in which the attachment portion is covered with the moving unit and a second position in which the attachment portion is exposed to allow attaching or removing of the storage bag.

In the sheet storage apparatus according to an embodiment of the present disclosure, an attachment pin may be provided to the exposed attachment portion, and the storage bag may be attached by fitting the attachment pin into a hole of the storage bag.

The sheet storage apparatus according to an embodiment of the present disclosure may be provided inside a sheet handling apparatus, and in the sheet storage apparatus, the moving unit is fixed inside the sheet handling apparatus, and the first slide unit may change the relative position to the second position by sliding the attachment unit to outside the sheet handling apparatus.

The sheet storage apparatus according to an embodiment of the present disclosure may be provided inside a sheet handling apparatus, and the sheet storage apparatus may further comprise a second slide unit that slides the attachment unit and the moving unit to outside the sheet handling apparatus.

In the sheet storage apparatus according to an embodiment of the present disclosure, the first slide unit may slide, to set the relative position to the second position, at least any one of the attachment unit and the moving unit which have been slid by the second slide unit to outside the sheet handling apparatus in a state where the relative position is the first position.

In the sheet storage apparatus according to an embodiment of the present disclosure, a direction of sliding by the first slide unit and a direction of sliding by the second slide unit may be opposite to each other.

In the sheet storage apparatus according to an embodiment of the present disclosure, a direction of sliding by the first slide unit and a direction of sliding by the second slide unit may be the same direction.

The sheet storage apparatus according to an embodiment of the present disclosure may further comprise: a detection unit that detects an operation error of the sheet storage apparatus; and a limiting unit that, when the operation error has been detected by the detection unit, limits sliding by the first slide unit.

The sheet storage apparatus according to an embodiment of the present disclosure may further comprise: a detection unit that detects an operation error of the sheet storage apparatus; and a limiting unit that, when the operation error has not been detected by the detection unit, limits sliding by the second slide unit, and the first slide unit may change the relative position to the second position by sliding the attachment unit to outside the sheet handling apparatus in a state where sliding by the second slide unit is limited.

The sheet storage apparatus according to an embodiment of the present disclosure may further comprise: an engagement mechanism that engages the attachment unit with the moving unit to lock the attachment unit to the moving unit. In a case where an operation error is present at the time of drawing the attachment unit or the moving unit, the attachment unit and the moving unit are kept engaged with each other, and the relative position of the attachment unit and the moving unit is kept at the first position. In a case where no operation error is present, the attachment unit and the moving unit are turned into an unlocked state, and sliding can be performed such that the relative position of the attachment unit and the moving unit is the second positon. The engagement mechanism may be configured to allow manually releasing the lock by drawing the attachment unit and the moving unit to outside of the apparatus.

In the sheet storage apparatus according to an embodiment of the present disclosure, the attachment unit may further comprise an opening that allows the storage bag attached to the attachment portion to be exposed.

In the sheet storage apparatus according to an embodiment of the present disclosure, the attachment unit may further comprise a stage that retains the sheets stored in the storage bag, and the opening may allow the stage to be exposed.

In the sheet storage apparatus according to an embodiment of the present disclosure, the attachment unit may further comprise a lid that closes the opening.

In the sheet storage apparatus according to an embodiment of the present disclosure, the moving unit may comprise a pushing portion that pushes the sheets to be moved in a direction toward an inside of the storage bag attached to the attachment portion, and a restricting portion that restricts movement of the sheets by the pushing portion toward the inside of the storage bag, and the restricting portion may comprise a gap that allows the pushing portion that moves in the direction to pass through.

A sheet handling apparatus according to an embodiment of the present disclosure comprises: a receiving unit that receives sheets; a handling unit that performs a predetermined process on the sheets; and the sheet storage apparatus described above.

According to the present disclosure, the attaching or removing of a storage bag can be performed with a simple structure and less space.

Hereinafter, embodiments of the present disclosure will be described with reference to the accompanying drawings. However, more than necessary detailed description, for example, detailed description of already well-known matter, repeated description of substantially the same components, and the like can be omitted. Like reference signs are assigned to the same components in the embodiments, and the repeated description can be omitted.

Embodiment 1

FIG. 1 is a diagram for illustrating components comprised by a sheet storage apparatus according to Embodiment 1 of the present disclosure. As shown in FIG. 1, the sheet storage apparatus 1 comprises an attachment unit 10, a moving unit 20, and a first slide unit 30.

The attachment unit 10 attaches a storage bag 600 for storing sheets 500. The attachment unit 10 comprises attachment portions 11 to which an entrance portion of the storage bag 600 is attached and fixed. As shown in FIG. 1, the attachment portions 11 are provided at the face of the attachment unit 10 adjacent to the moving unit 20. A body part of the storage bag 600 extends from the entrance portion attached to the attachment portions 11 toward the inside of the attachment unit 10. Thus, the storage bag 600 is stored inside the attachment unit 10. The sheets 500 are papers with a predetermined size, such as banknotes and securities.

In the following description, of the pair of attachment portions 11, a direction heading from one toward the other is defined as first direction. A direction in which the sheets 500 are moved when stored in the storage bag 600, that is, a direction from the entrance of the storage bag 600 toward the bottom, is defined as storage direction. The first direction and the storage direction are mutually orthogonal directions. FIG. 1 is a sectional view of the sheet storage apparatus 1, taken along a plane orthogonal to the first direction and the storage direction.

The moving unit 20 moves the sheets 500 supplied from outside the sheet storage apparatus 1 to inside the storage bag 600 and stores the sheets 500 in the storage bag 600.

The first slide unit 30 slides at least any one of the attachment unit 10 and the moving unit 20 to change the relative position between the attachment unit 10 and the moving unit 20. The first slide unit 30 slides at least any one of the attachment unit 10 and the moving unit 20 in a predetermined slide direction. The slide direction is, for example, the same direction as the storage direction.

The length of the first slide unit 30 in the slide direction is determined based on a distance by which at least any one of the attachment unit 10 and the moving unit 20 is slid. The first slide unit 30 may be configured to be extendable and retractable. In this case, the longest length of the first slide unit 30 may be determined based on a distance by which at least any one of the attachment unit 10 and the moving unit 20 is slid.

Figure 2:
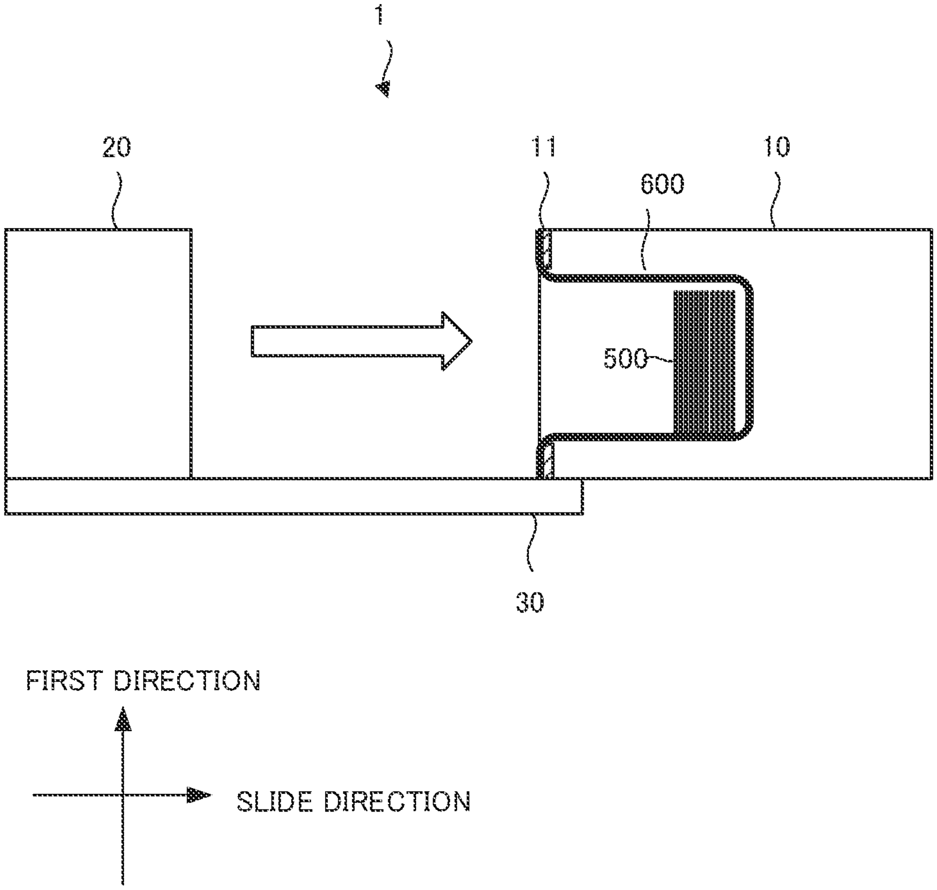
FIG. 2 is a diagram for illustrating a state where, in Embodiment 1, a relative position between an attachment unit and a moving unit becomes a second position.

The first slide unit 30 changes the relative position between the attachment unit 10 and the moving unit 20 between a first position shown in FIG. 1 and a second position shown in FIG. 2. FIG. 2 is a diagram for illustrating a state where the relative position between the attachment unit 10 and the moving unit 20 in the sheet storage apparatus 1 becomes the second position. FIG. 2 shows, for example, the case where the attachment unit 10 is moved by the first slide unit 30; however, the present disclosure is not limited thereto. The moving unit 20 may be moved by the first slide unit 30. By combining both configurations, the attachment unit 10 and the moving unit 20 may be moved in mutually separating directions.

In the first position shown in FIG. 1, the attachment unit 10 and the moving unit 20 are close to each other, and the attachment portion 11 of the attachment unit 10 is covered with the moving unit 20.

On the other hand, in the second position shown in FIG. 2, the attachment unit 10 and the moving unit 20 are separated from each other, and the attachment portion 11 of the attachment unit 10 is not covered with the moving unit 20 and is exposed. In the specification, a state where an object is exposed means a state where an operator of the sheet storage apparatus 1 can easily access the object from outside. In other words, a state where the attachment portion 11 is exposed is a state where the operator can easily touch the attachment portion 11 by reaching the hand to the attachment portion 11 or attaching the storage bag 600 to or from the attachment portion 11 to attach or remove the storage bag 600.

The attachment unit 10 allows the operator of the sheet storage apparatus 1 to easily attach the storage bag 600 to the attachment portion 11 in a state where the attachment portion 11 is exposed to outside.

With the sheet storage apparatus 1 according to Embodiment 1, the first slide unit 30 is allowed to change the relative position between the attachment unit 10 and the moving unit 20 between the first position in which the attachment portion 11 of the attachment unit 10 is covered with the moving unit 20 and the second position in which the storage bag 600 can be attached to or removed from the attachment portion 11. Thus, the sheet storage apparatus 1 according to Embodiment 1 allows attachment or removal of the storage bag 600 with a simple structure and less space.

Embodiment 2

In Embodiment 2, the sheet storage apparatus 1 is provided inside a sheet handling apparatus 100.

Figure 3:
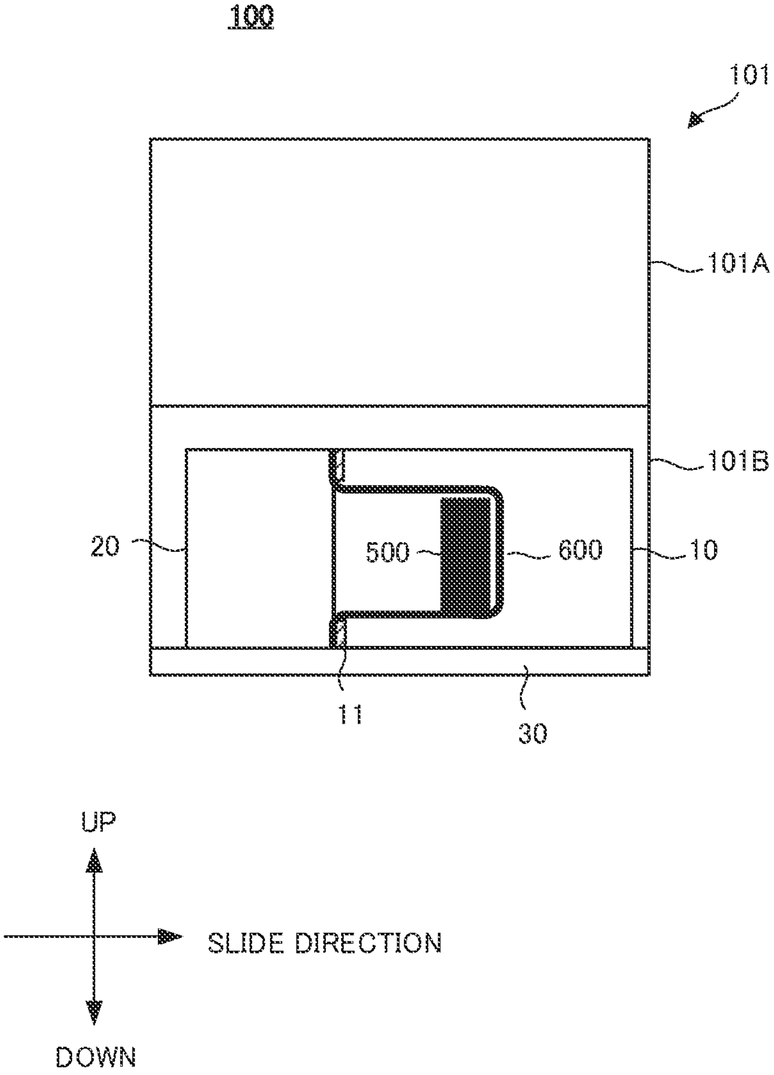
FIG. 3 is a diagram showing a state where the attachment unit and the moving unit are placed in a first position according to Embodiment 2.

FIG. 3 is a diagram showing components of the sheet handling apparatus 100 and the sheet storage apparatus 1 according to Embodiment 2. In the following description, the storage bag 600 is attached in a horizontal orientation to the sheet storage apparatus 1. The horizontal orientation means a state where the entrance of the storage bag 600 is orientated in a direction perpendicular to an up and down direction. Therefore, in the following description, the first direction in Embodiment 1 is a direction heading from the lower side toward the upper side in the case where the sheet storage apparatus 1 is installed on a horizontal plane.

In the following description, the up and down direction is assumed to correspond to the up and down direction of the sheet storage apparatus 1 and the sheet handling apparatus 100. The up and down direction of the sheet storage apparatus 1 and the up and down direction of the sheet handling apparatus 100 are the same direction, and the up and down direction of the sheet storage apparatus 1 and the sheet handling apparatus 100 is a direction orthogonal to the above-described slide direction. FIG. 3 is a sectional view of the sheet storage apparatus 1 and the sheet handling apparatus 100, taken along a plane including the up and down direction and the slide direction.

The sheet handling apparatus 100 is an apparatus that performs a predetermined process on the sheets 500. When, for example, the sheets 500 are banknotes, the sheet handling apparatus 100 can perform at least one of a deposit and a withdrawal of banknotes.

Of the sheets 500 to be handled in the sheet handling apparatus 100, at least part of the sheets 500 is stored in the storage bag 600 attached to the attachment portion 11 of the attachment unit 10 by the moving unit 20.

In Embodiment 2, the moving unit 20 is fixed inside the sheet handling apparatus 100.

Figure 4:
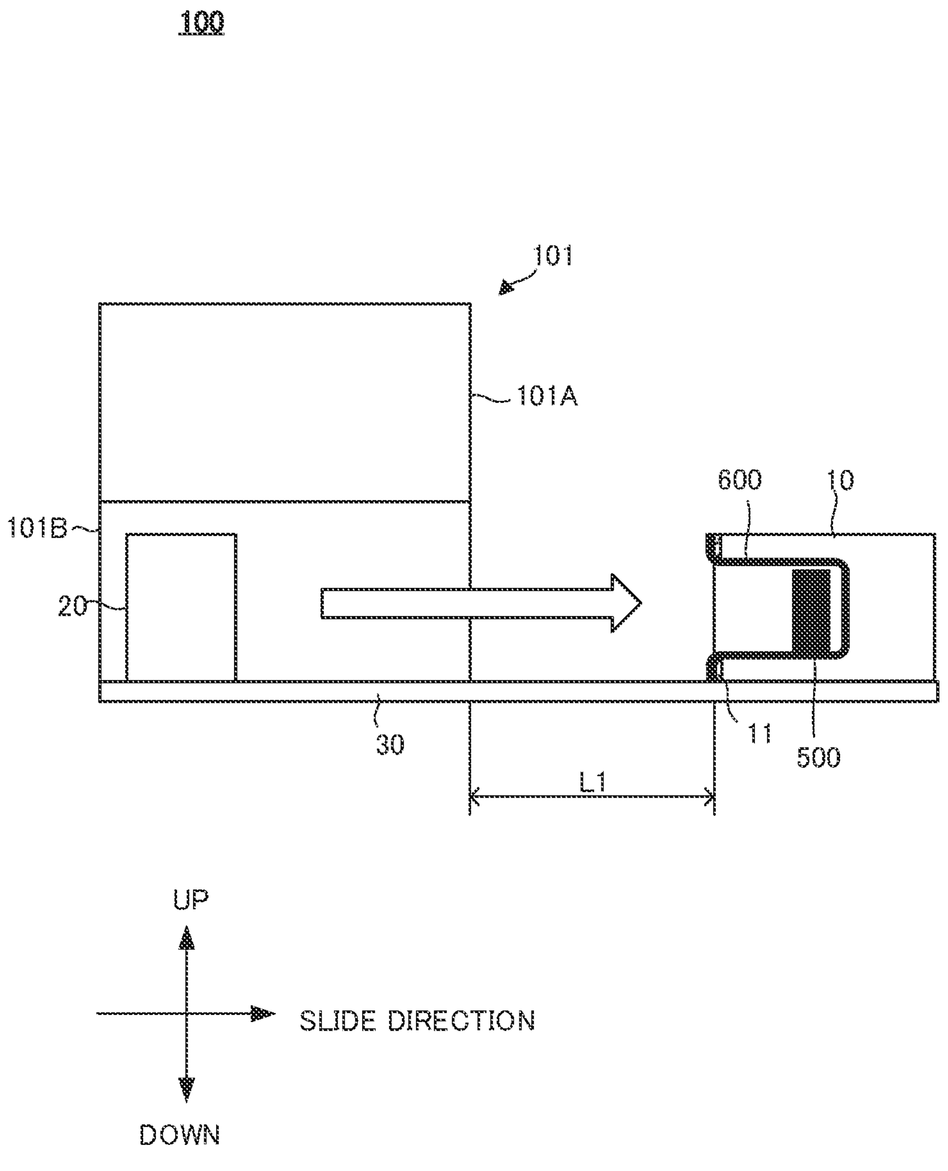
FIG. 4 is a diagram showing a state where the attachment unit and the moving unit are placed in the second position according to Embodiment 2.

FIG. 3 shows a state where the attachment unit 10 and the moving unit 20 are placed in the first position according to Embodiment 2. FIG. 4 shows a state where the attachment unit 10 and the moving unit 20 are placed in the second position according to Embodiment 2.

In the first position, as in the case of Embodiment 1, the attachment unit 10 and the moving unit 20 are close to each other, and the attachment portion 11 of the attachment unit 10 is covered with the moving unit 20. When the attachment unit 10 and the moving unit 20 are placed in the first position, the attachment unit 10 and the moving unit 20 both are stored inside the sheet handling apparatus 100.

On the other hand, in the second position, the attachment unit 10 and the moving unit 20 are separated from each other, and the attachment unit 10 and the moving unit 20 both are moved to outside the sheet handling apparatus 100. In the second position, the attachment portion 11 of the attachment unit 10 is not covered with the moving unit 20, and the storage bag 600 can be attached or removed. Thus, the attachment portion 11 of the attachment unit 10 is exposed to outside.

In Embodiment 2, the first slide unit 30 slides the attachment unit 10 until the entire attachment unit 10 is placed outside the sheet handling apparatus 100. At this time, the first slide unit 30 may slide the attachment unit 10 to a position in which an operator of the sheet handling apparatus 100 easily attach or remove the storage bag 600 to or from the attachment unit 10 drawn to outside the sheet handling apparatus 100. Thus, the operator of the sheet handling apparatus 100 can easily attach the storage bag 600 to the sheet storage apparatus 1.

In other words, in the second position in Embodiment 2, the distance between the attachment portion 11 and the sheet handling apparatus 100 is sufficiently large. Since the distance between the attachment portion 11 and the sheet handling apparatus 100 is sufficiently large, for example, the operator of the sheet storage apparatus 1, who attaches the storage bag 600, can easily reach the hand to between the attachment portion 11 and the sheet handling apparatus 100. Thus, the operator can easily perform work for attaching the storage bag 600.

The length of the first slide unit 30 is configured to be extendable and retractable. Thus, the first slide unit 30 is sufficiently extendable to outside the sheet handling apparatus 100 and is capable of setting the relative position between the attachment unit 10 and the moving unit 20 to the second position.

The distance L1 from the sheet handling apparatus 100 to the attachment portion 11 in the second position, shown in FIG. 4, is a distance by which the operator of the sheet handling apparatus 100 is capable of attaching or removing the storage bag 600 from outside the sheet handling apparatus 100 to the attachment unit 10 or from the attachment unit 10 to outside the sheet handling apparatus 100 with sufficient space as described above.

With the sheet handling apparatus 100 according to Embodiment 2, the storage bag 600 can be attached or removed with a simple structure and less space.

Embodiment 3

In Embodiment 3, the sheet storage apparatus 1 further comprises a second slide unit 40 and changes the relative position between the attachment unit 10 and the moving unit 20 by two-step sliding. The second slide unit 40, as in the case of the first slide unit 30 according to Embodiment 2, is configured to be extendable and retractable.

Figure 5:
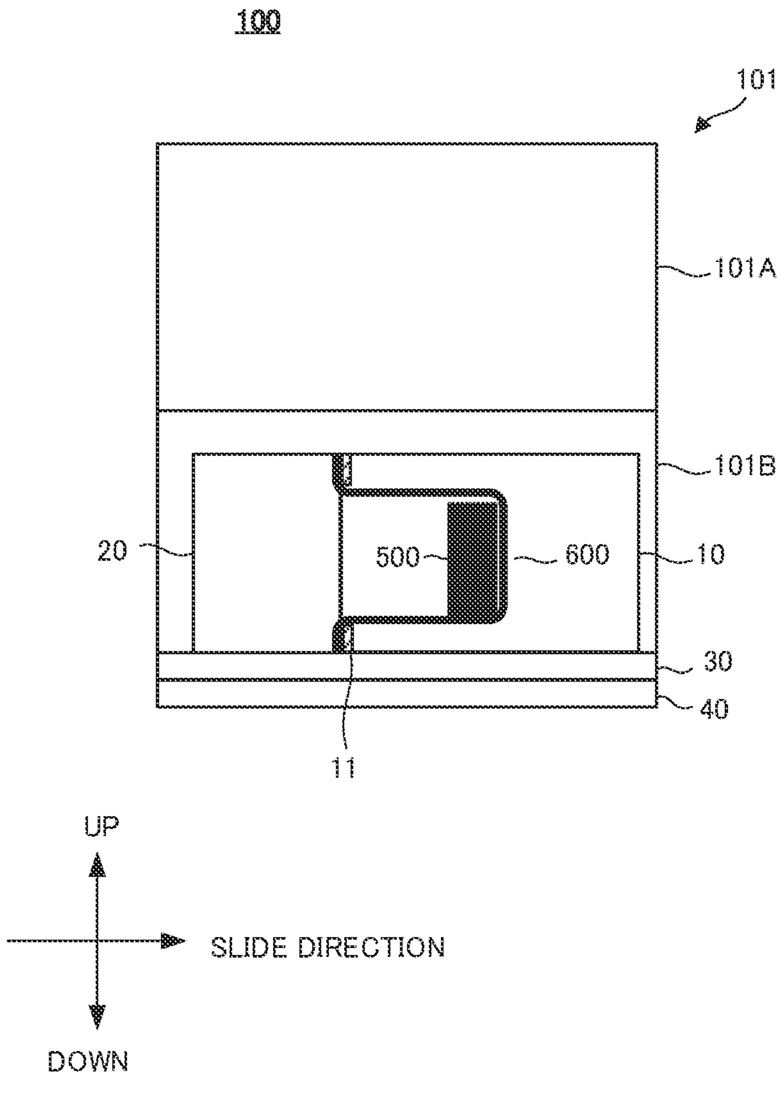
FIG. 5 is a diagram showing components of a sheet handling apparatus and a sheet storage apparatus according to Embodiment 3.

FIG. 5 is a diagram showing components of the sheet handling apparatus 100 and the sheet storage apparatus 1 according to Embodiment 3.

Figure 6:
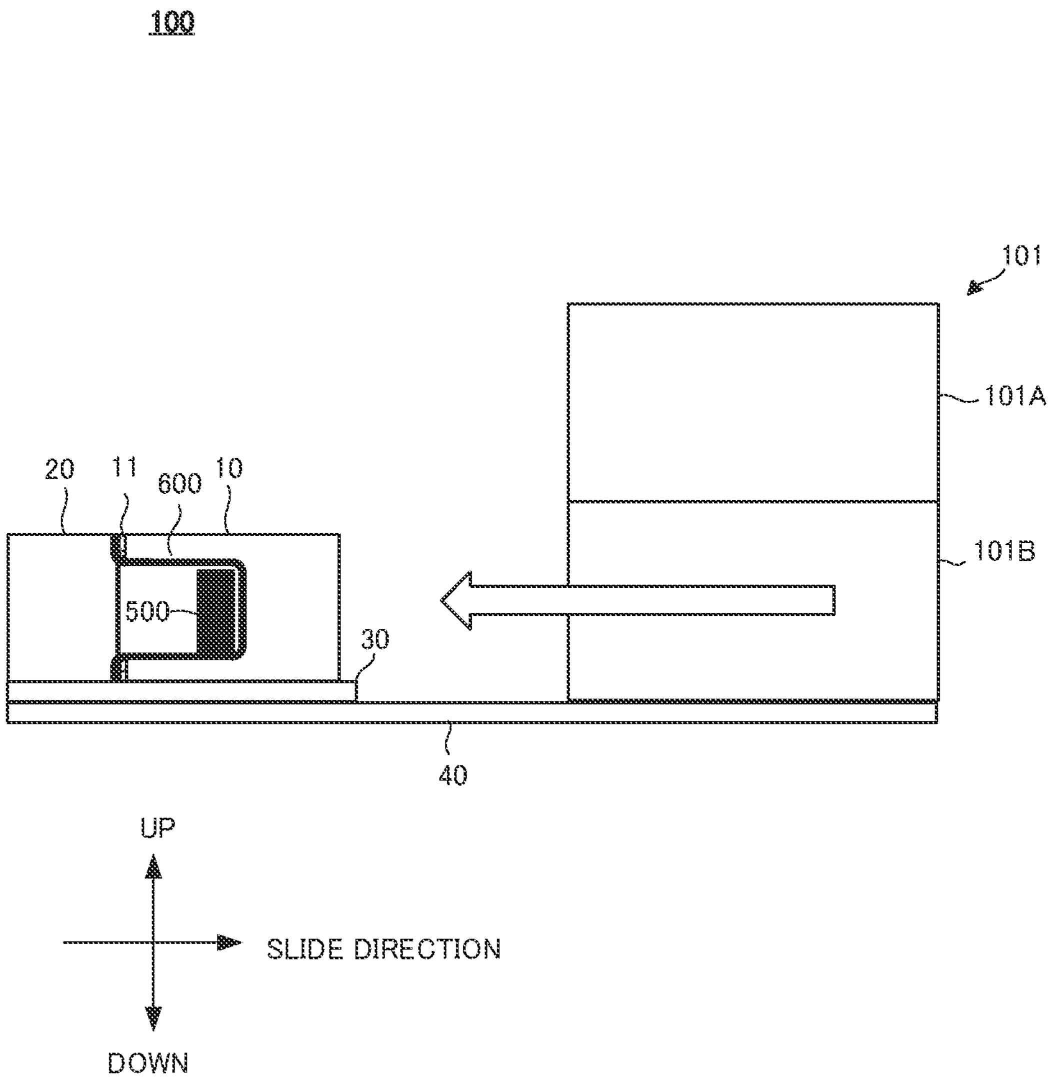
FIG. 6 is a diagram showing a state where an attachment unit and a moving unit of which the relative position remains in the first position are integrally slid by a second slide unit to outside the sheet handling apparatus according to Embodiment 3.

In Embodiment 3, the moving unit 20 is not fixed to inside the sheet handling apparatus 100, and the attachment unit 10 and the moving unit 20 are slidable by the second slide unit 40 to outside the sheet handling apparatus 100. FIG. 6 is a diagram showing a state where the attachment unit 10 and the moving unit 20, of which the relative position remains in the first position, are integrally slid to outside the sheet handling apparatus 100 by the second slide unit 40.

Figure 7:
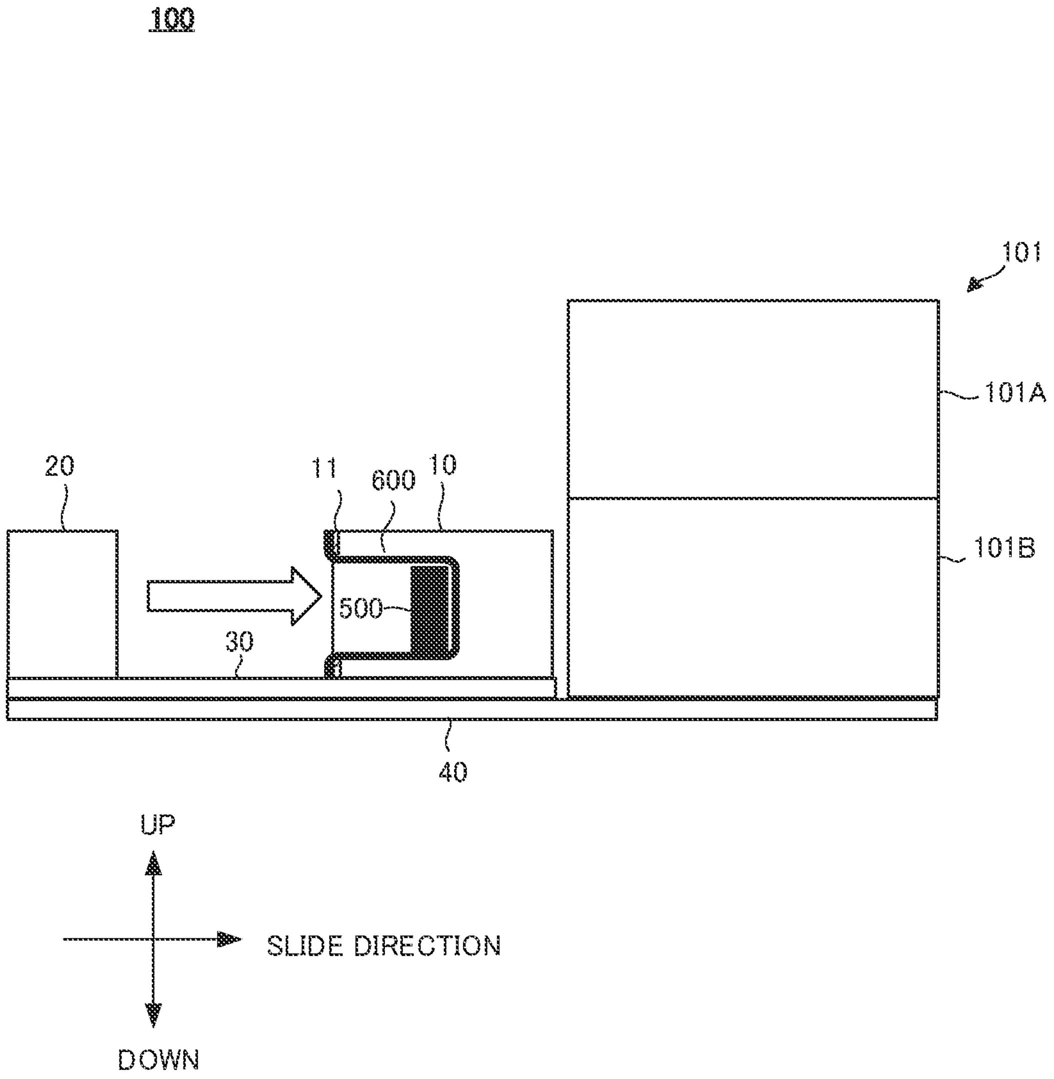
FIG. 7 is a diagram showing a state where the attachment unit and the moving unit are drawn by the second slide unit to outside the sheet handling apparatus and then the relative position between the attachment unit and the moving unit is changed by the first slide unit to the second position according to Embodiment 3.

FIG. 7 is a diagram showing a state where the attachment unit 10 and the moving unit 20 are drawn to outside the sheet handling apparatus 100 by the second slide unit 40 and then the relative position between the attachment unit 10 and the moving unit 20 is changed to the second position by the first slide unit 30. Specifically, by sliding the attachment unit 10 from the first position shown in FIG. 6 with the first slide unit 30 in a direction opposite to the direction of sliding by the second slide unit 40, the relative position is changed to the second position shown in FIG. 7.

By using the second slide unit 40 in this way, further sufficient space is ensured between the attachment portion 11 and the moving unit 20. Therefore, the sheet storage apparatus 1 according to Embodiment 3 is capable of attaching or removing the storage bag 600 with a simple structure and less space.

Figure 8:
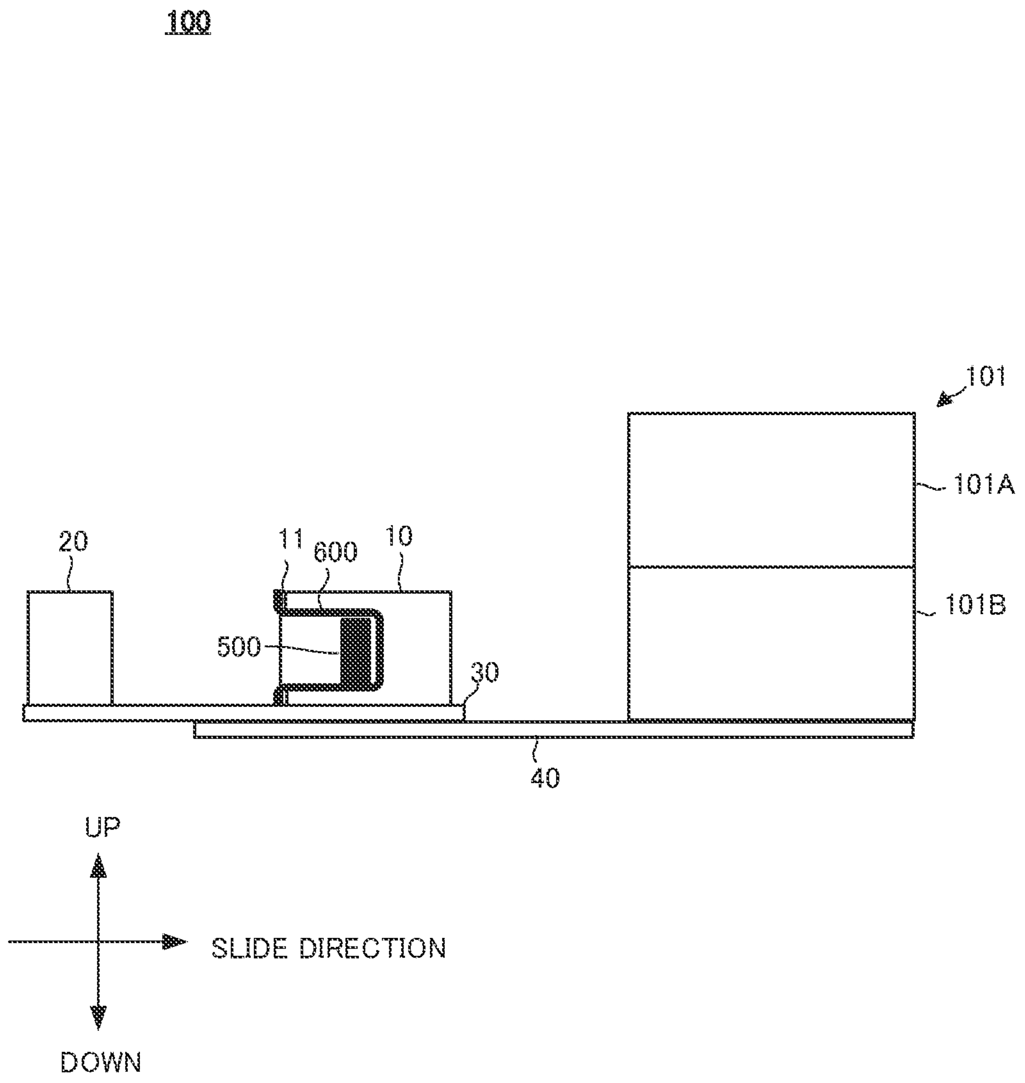
FIG. 8 is a diagram showing a state where, when a direction of sliding by the first slide unit and a direction of sliding by the second slide unit are the same direction, the relative position is changed to the second position as a result of sliding of the moving unit by the first slide unit according to Embodiment 3.

In Embodiment 3, the case where the direction of sliding by the first slide unit 30 and the direction of sliding by the second slide unit 40 are opposite to each other has been described; however, the present disclosure is not limited thereto. For example, the moving unit 20 may be configured to be slid from the first position shown in FIG. 6 by the first slide unit 30 toward the same direction as the direction of sliding by the second slide unit 40. FIG. 8 is a diagram showing a state where, when the direction of sliding by the first slide unit 30 and the direction of sliding by the second slide unit 40 are the same direction, the relative position changes to the second position as a result of sliding of the moving unit 20 with the first slide unit 30.

Figure 9:
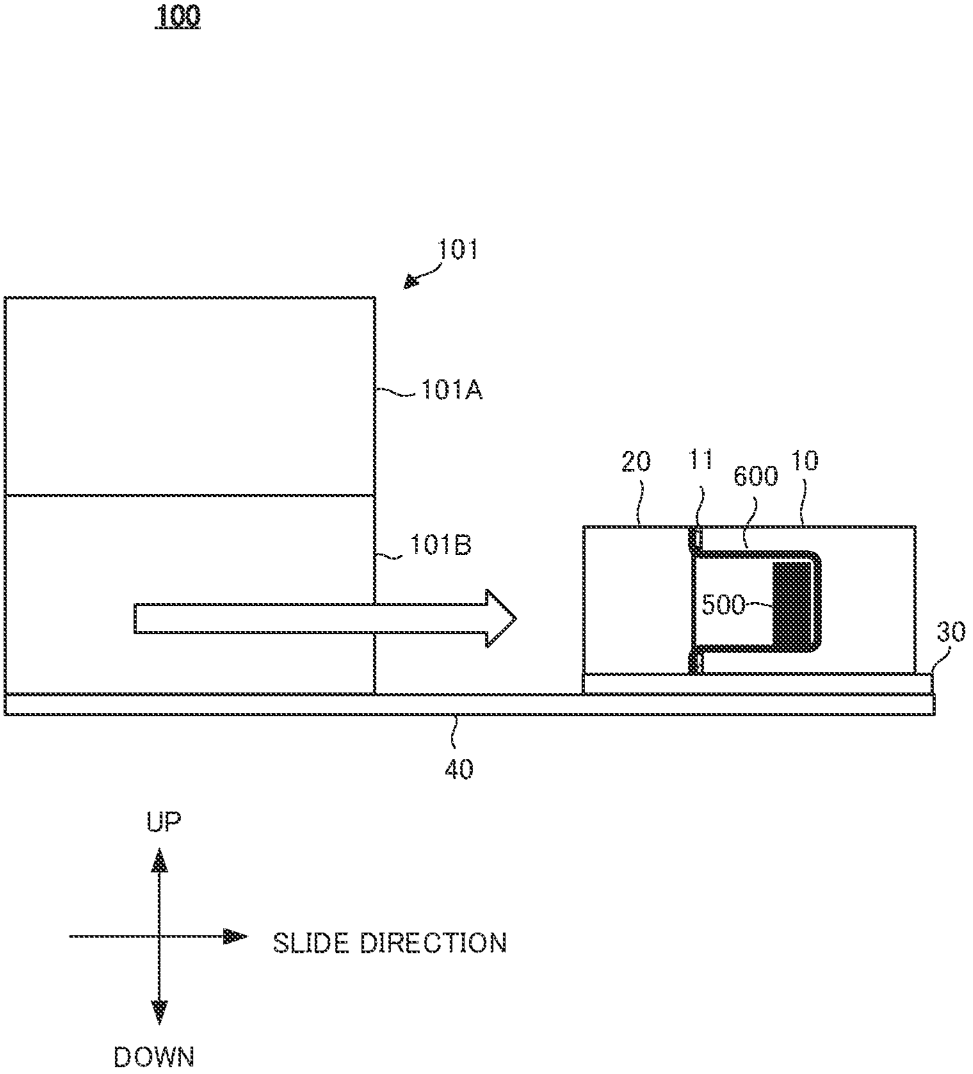
FIG. 9 is a diagram showing a state where, when the direction of sliding by the second slide unit is opposite to that of FIG. 6, the attachment unit and the moving unit of which the relative position remains in the first position are integrally slid to outside the sheet handling apparatus according to Embodiment 3.
Figure 10:
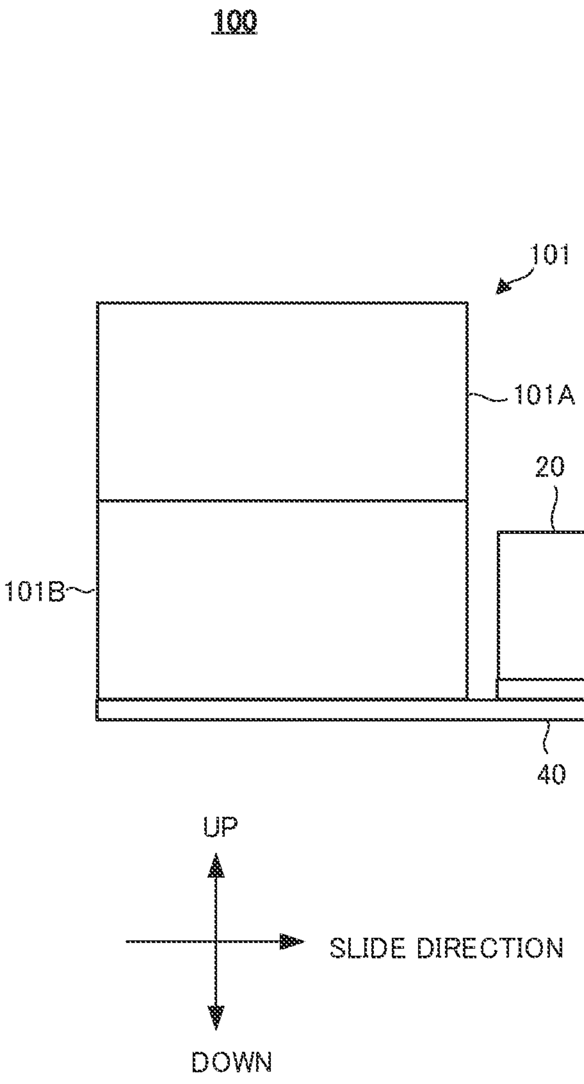
FIG. 10 is a diagram showing a state where, after FIG. 9, the first slide unit moves the moving unit toward a direction opposite to the direction of sliding by the second slide unit to change the relative position to the second position according to Embodiment 3.
Figure 11:
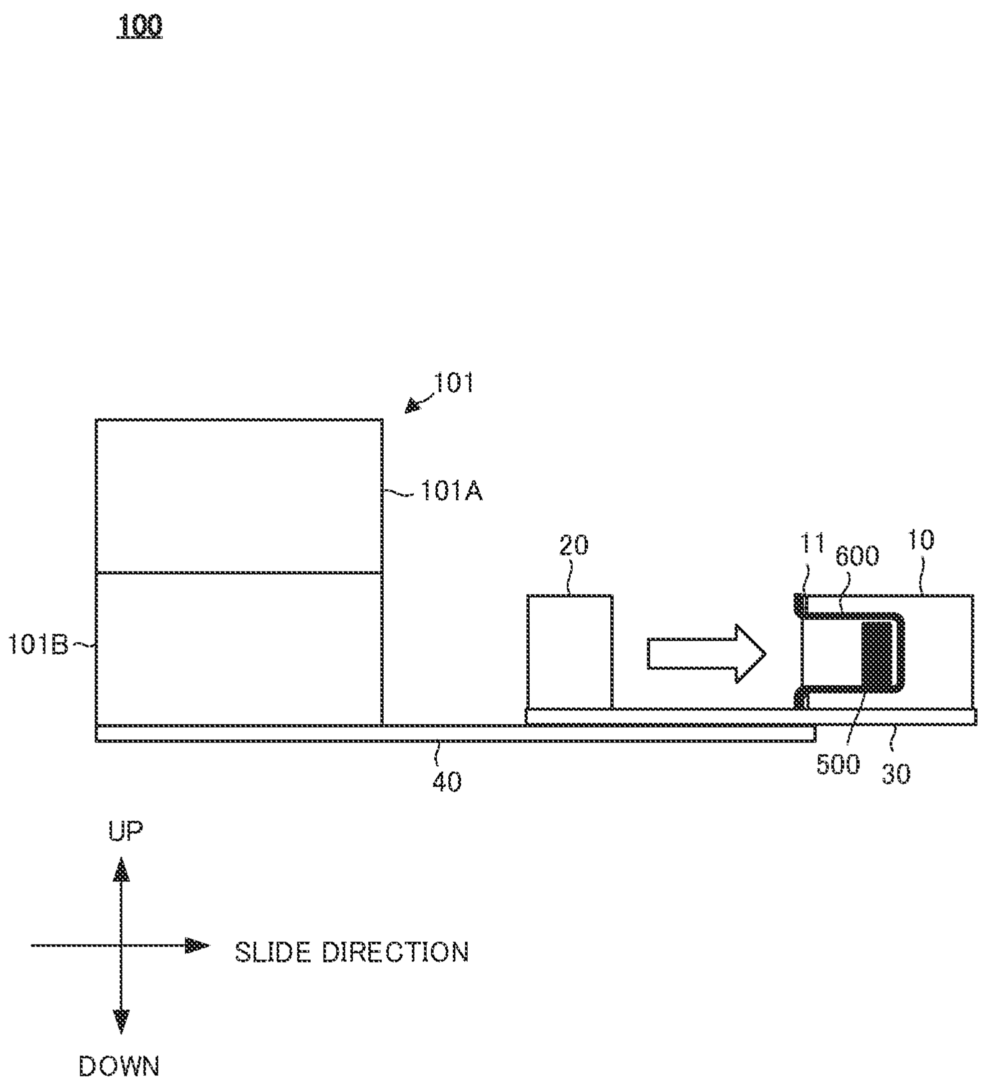
FIG. 11 is a diagram showing a state where, after FIG. 9, the first slide unit moves the moving unit toward the same direction as the direction of sliding by the second slide unit to change the relative position to the second position according to Embodiment 3.

In Embodiment 3, the direction of sliding by the second slide unit 40 may be opposite to the direction shown in FIG. 6. FIG. 9 is a diagram showing a state where, when the direction of sliding by the second slide unit 40 is opposite to that of FIG. 6, the attachment unit 10 and the moving unit 20 of which the relative position remains in the first position are integrally slid to outside the sheet handling apparatus 100 according to Embodiment 3. FIG. 10 is a diagram showing a state where, after FIG. 9, the relative position is changed to the second position by moving the moving unit 20 with the first slide unit 30 toward a direction opposite to the direction of sliding by the second slide unit 40. FIG. 11 is a diagram showing a state where, after FIG. 9, the relative position is changed to the second position by moving the moving unit 20 with the first slide unit 30 toward the same direction as the direction of sliding by the second slide unit 40.

With the sheet storage apparatus 1 according to Embodiment 3, the storage bag 600 can be attached or removed with a simple structure and less space.

Embodiment 4

In Embodiment 4, the sheet storage apparatus 1 further comprises a detection unit 70 and a limiting unit 80.

The detection unit 70 detects an operation error of the sheet storage apparatus 1. An operation error to be detected by the detection unit 70 is, for example, an error that can occur in the operation of at least any one component of the sheet storage apparatus 1 while the sheets 500 are being stored in the storage bag 600 by the moving unit 20.

Examples of the operation error that can occur in the sheet storage apparatus 1 include an example in which sheets 500 to be stored in an upright position fall down inside the storage bag 600 or an example in which the storage bag 600 unintentionally comes off from the attachment portion 11.

The detection unit 70 comprises, for example, a sensor or the like that detects a fall of the sheets 500. When the detection unit 70 has detected that the sheets have fallen down, the detection unit 70 determines that an operation error has been detected. Alternatively, the detection unit 70 may comprise a sensor or the like that detects removal of the storage bag 600 from the attachment portion 11. When the detection unit 70 has detected that the storage bag 600 has been removed from the attachment portion 11, the detection unit 70 may determine that an operation error has been detected. An operation error in the present disclosure may be an error other than the above-described examples. The detection unit 70 may be configured to be capable of detecting operation errors of multiple types or may be configured to be capable of detecting only an operation error of any one type. When the detection unit 70 has detected an operation error, the detection unit 70 sends an error detection signal to the limiting unit 80.

When the limiting unit 80 has received an error detection signal from the detection unit 70, the limiting unit 80 activates and locks a lock mechanism 31 provided in the first slide unit 30. The lock mechanism 31 restricts sliding of the attachment unit 10 and the moving unit 20 by the first slide unit 30 based on control of the limiting unit 80. The lock mechanism 31 is, for example, an electromagnetic lock. Thus, only when no operation error of the sheet storage apparatus 1 has been detected by the detection unit 70, sliding of the attachment unit 10 and the moving unit 20 by the first slide unit 30 is permitted. On the other hand, when an operation error of the sheet storage apparatus 1 has been detected by the detection unit 70, sliding to change the relative position between the attachment unit 10 and the moving unit 20 by the first slide unit 30 is not possible.

Figure 12:
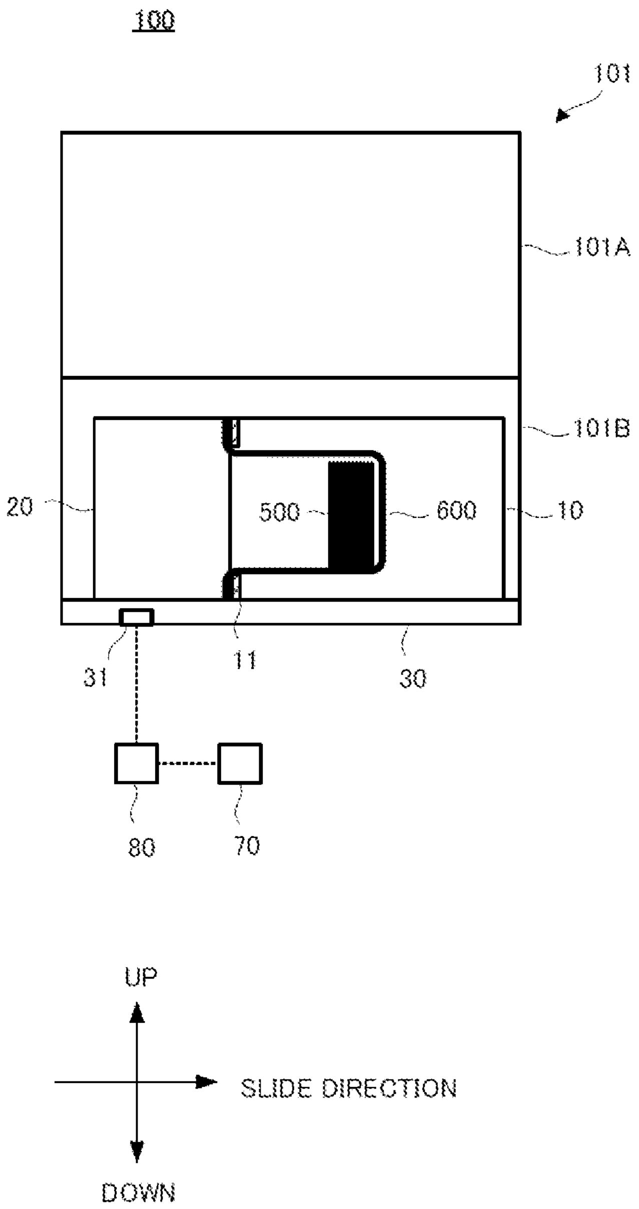
FIG. 12 is a diagram showing the configuration of a sheet handling apparatus in the case where a first slide unit comprises a lock mechanism according to Embodiment 4.

FIG. 12 is a diagram showing the configuration of the sheet handling apparatus 100 in the case where the first slide unit 30 comprises the lock mechanism 31 according to Embodiment 4. In FIG. 12, components connected to each other by the dashed line indicate that the components are communicably connected to each other.

With such a configuration, when an operation error has been detected by the detection unit 70, the relative position between the attachment unit 10 and the moving unit 20 is maintained in the first position shown in FIG. 5 and the like. Even when the limiting unit 80 is limiting sliding by the first slide unit 30, sliding by the second slide unit 40 is not limited. Therefore, the attachment unit 10 and the moving unit 20 are slidable to outside the sheet handling apparatus 100 as shown in FIG. 6, FIG. 9, or the like by the second slide unit 40 while the relative position remains in the first position.

On the other hand, when no operation error has been detected by the detection unit 70, the relative position between the attachment unit 10 and the moving unit 20 can be changed between the first position and the second position. A mechanism of limiting a change of the relative position by using the first slide unit 30 is not limited to the lock mechanism 31 provided in the first slide unit 30. Alternatively, the mechanism may be, for example, an engagement mechanism that engages the attachment unit 10 with the moving unit 20 to lock the attachment unit 10 with the moving unit 20. Lock of the engagement device may be configured to allow manually releasing the lock after the attachment unit 10 and the moving unit 20 are drawn from the apparatus.

With the sheet storage apparatus 1 according to Embodiment 4, when no operation error has been detected, the relative position between the attachment unit 10 and the moving unit 20 can be set to the second position, so the storage bag 600 can be easily attached to the attachment unit 10. On the other hand, when an operation error has been detected, the relative position between the attachment unit 10 and the moving unit 20 is fixed in the first position, so the operator is disabled to access the attachment portion 11 until the operation error is eliminated. Thus, before a specialist or the like who can perform maintenance of the sheet storage apparatus 1 comes, the operator attempts to remove the storage bag 600 forcibly in a state where the operation error has not been eliminated, with the result that it is possible to prevent occurrence of more significant failure.

Modification of Embodiment 4

In the above-described Embodiment 4, when an operation error has been detected by the detection unit 70, the limiting unit 80 activates the lock mechanism 31 of the first slide unit 30; however, the present disclosure is not limited thereto. For example, when no operation error has been detected by the detection unit 70, the limiting unit 80 may set the lock mechanism 31 of the first slide unit 30 to a locked state, and, when an operation error has been detected, lock of the lock mechanism 31 may be released. For example, for an operation error related to only any one of the moving unit 20 and the attachment unit 10, the lock mechanism 31 is activated to release the lock when an operation error has been detected, so it is easy to access a unit that is a source of the operation error. The operation of the lock mechanism 31 may be changed according to the type of an operation error detected.

Figure 13:
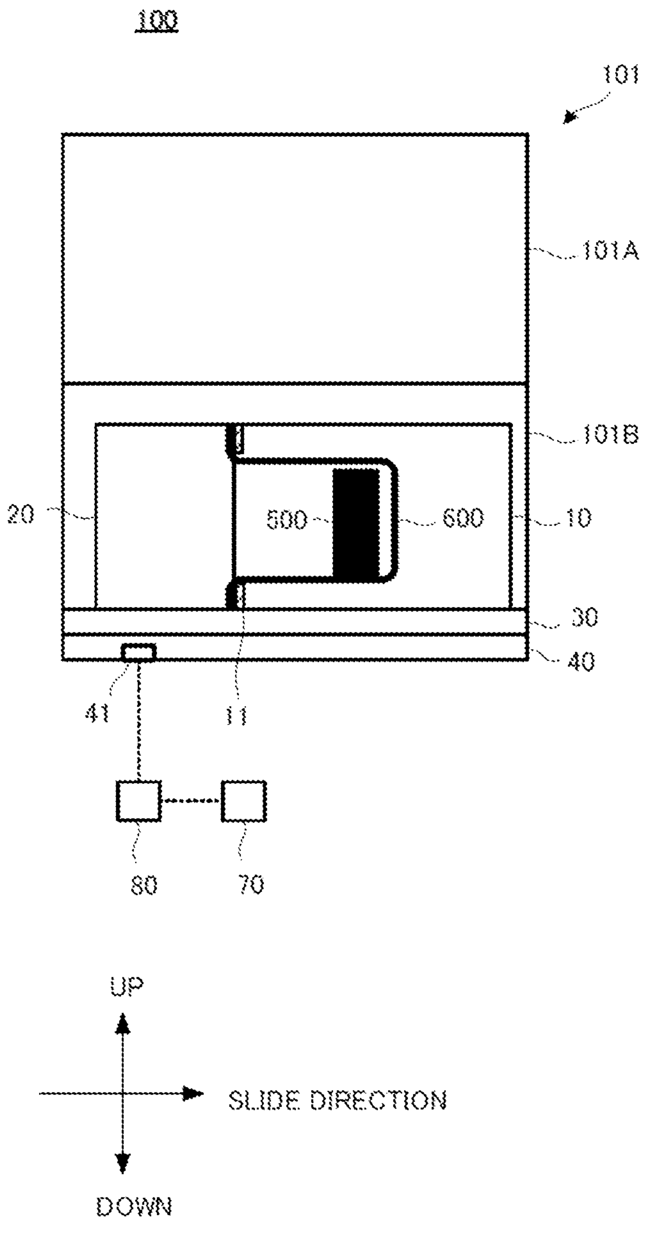
FIG. 13 is a diagram showing the configuration of a sheet handling apparatus in the case where a second slide unit comprises a lock mechanism according to Embodiment 4.

Not the first slide unit 30 but the second slide unit 40 may comprise a lock mechanism 41. FIG. 13 is a diagram showing the configuration of the sheet handling apparatus 100 in the case where the second slide unit 40 comprises the lock mechanism 41 according to the modification of Embodiment 4. With such a configuration, when no operation error has been detected by the detection unit 70, the limiting unit 80 activates the lock mechanism 41 of the second slide unit 40. When an operation error has been detected by the detection unit 70, the limiting unit 80 activates the lock mechanism 41 of the second slide unit 40.

Alternatively, the first slide unit 30 and the second slide unit 40 each may comprise a lock mechanism and may be configured to be activated in cooperation with each other or independently of each other by the limiting unit 80.

In this case, when no operation error has been detected by the detection unit 70, the limiting unit 80 limits sliding with the second slide unit 40. In this case as well, sliding by the first slide unit 30 is not restricted. Therefore, when, for example, the first slide unit 30 slides the attachment unit 10 to outside the sheet handling apparatus 100, it is possible to change the relative position to the second position and attach or remove the storage bag 600 to or from the attachment unit 10.

Embodiment 5

In Embodiment 5, the structure of the attachment unit 10 of the sheet storage apparatus 1 will be described in detail. The attachment unit 10 is a unit that allows the storage bag 600 to be attached in a horizontal orientation. The horizontal orientation is an orientation orthogonal to the up and down direction. Furthermore, the horizontally orientated storage bag 600 is attached in the slide direction and the storage direction.

Figure 14A:
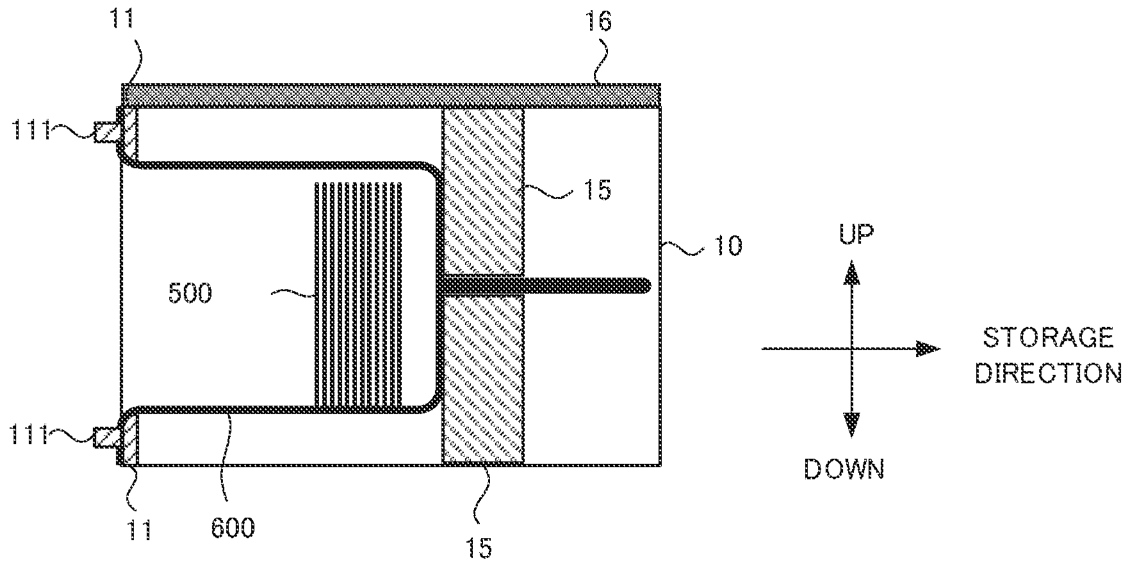
FIG. 14A is a diagram for illustrating an example of the structure of an attachment unit according to Embodiment 5.
Figure 14B:
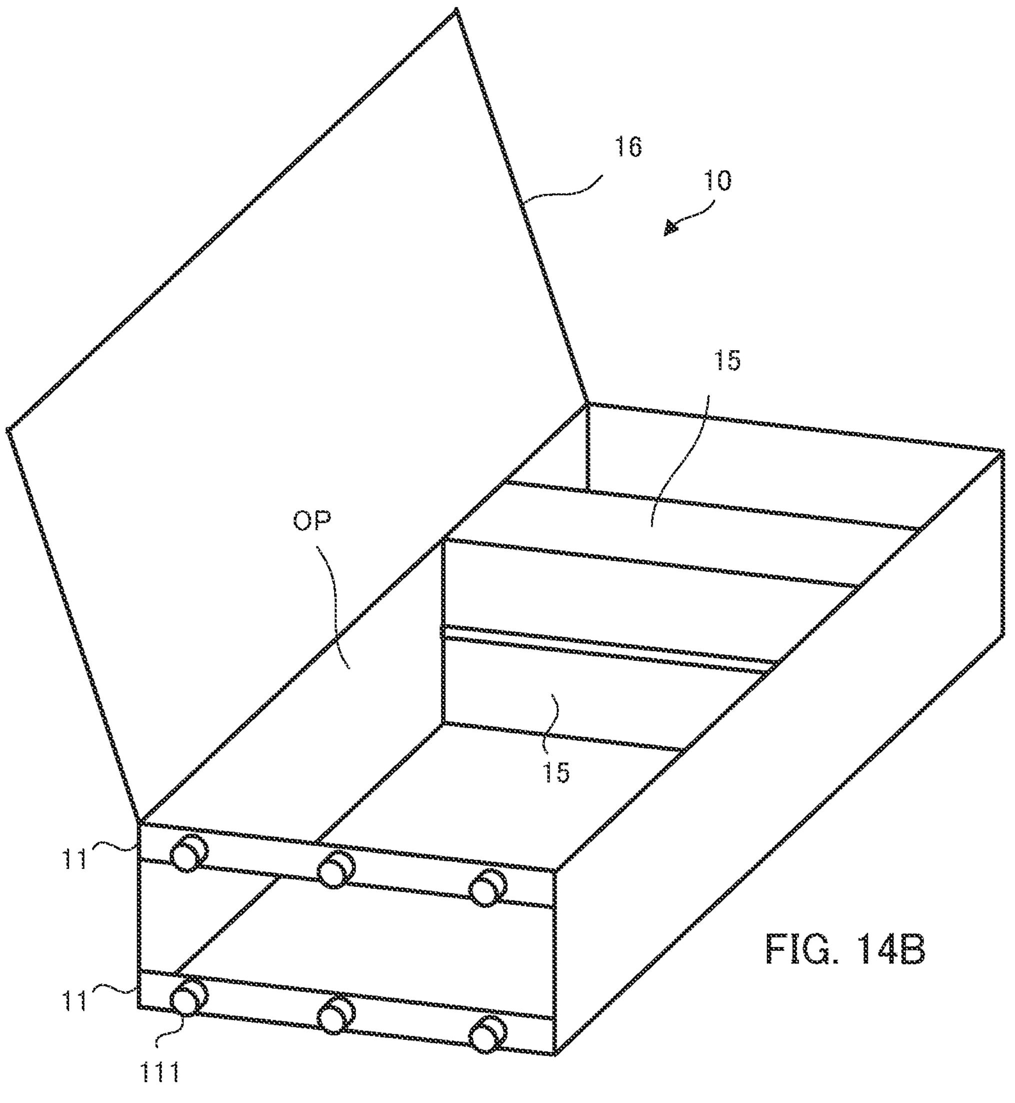
FIG. 14B is a diagram for illustrating an example of the structure of the attachment unit according to Embodiment 5.

FIGS. 14A and 14B are diagrams for illustrating an example of the structure of the attachment unit 10. As shown in FIGS. 14A and 14B, the attachment unit 10 comprises the attachment portion 11, attachment pins 111, an opening OP, a stage 15, and a lid 16. FIG. 14A is a sectional view of the attachment unit 10, taken along a plane including the up and down direction and the storage direction. FIG. 14B is a perspective view showing the structure of the attachment unit 10.

The attachment portion 11 is a portion to which the storage bag 600 is attached. The attachment portion 11 is provided in the attachment unit 10 near the boundary with the moving unit 20 and is exposed from the attachment unit 10 to outside. The attachment portion 11 comprises the plurality of attachment pins 111. The storage bag 600 is attached to the attachment portion 11 in a horizontal orientation when holes provided near the entrance of the storage bag 600 are fitted to the attachment pins 111.

The opening OP is provided at the top face of the attachment unit 10. Thus, an operator can easily access the inside of the attachment unit 10 through the opening OP.

The stage 15 movable in the storage direction is provided inside the attachment unit 10. The stage 15 adjusts the depth from the entrance of the storage bag 600 attached in a horizontal orientation to the bottom. The position of the stage 15 is adjusted as needed by a control unit 50 shown in, for example, FIG. 12 or the like.

A gap is provided near the center of the stage 15 in the right and left direction or the up and down direction. FIGS. 14A and 14B show an example in which a gap is provided near the center of the stage 15 in the up and down direction. Through the gap, part of the storage bag 600 extends toward a far side in the storage direction. With such a configuration, by moving the stage 15, the size of storable space inside the storage bag 600 changes. Therefore, by moving the stage 15, it is possible to adjust the amount of sheets 500 storable inside the storage bag 600.

The lid 16 for closing the opening OP is provided at the opening OP. The lid 16 is openable and closeable by, for example, a hinge and can be opened and closed by the operator with hand. Since the operator can access the inside of the attachment unit 10 by opening the lid 16, the storage bag 600 is easily attached to the attachment unit 10.

Embodiment 6

In Embodiment 6, the structure of the moving unit 20 of the sheet storage apparatus 1 will be described in detail.

Figure 15A:
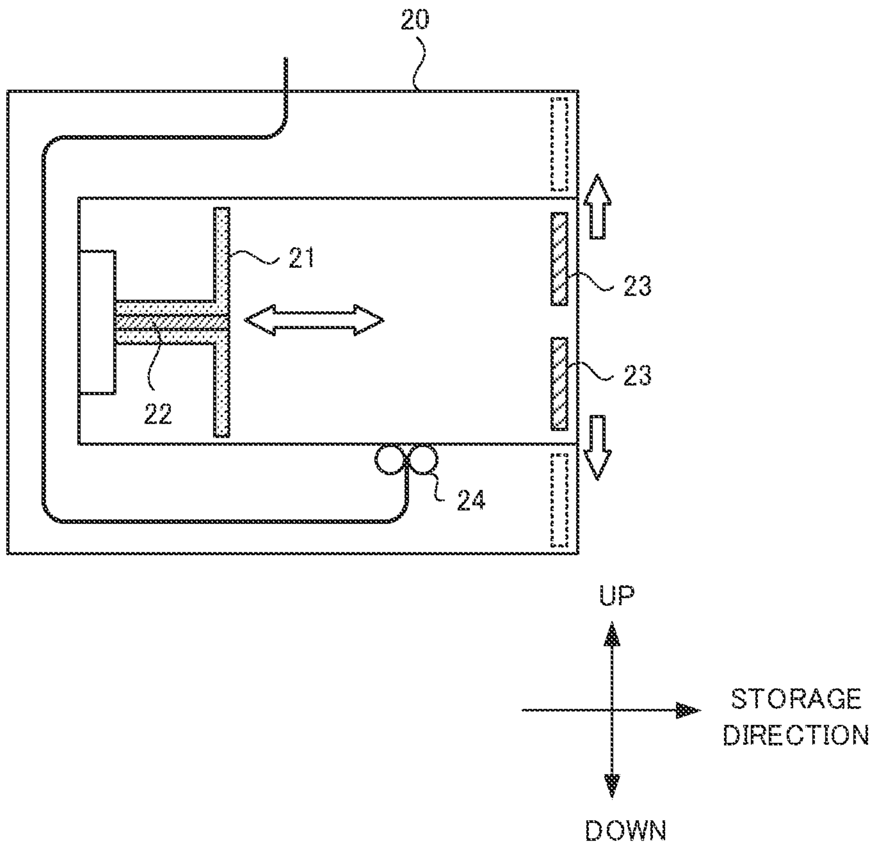
FIG. 15A is a diagram for illustrating an example of the structure of a moving unit according to Embodiment 6.
Figure 15B:
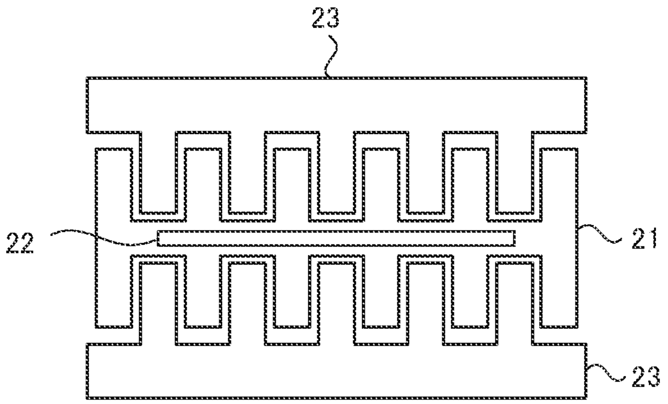
FIG. 15B is a diagram for illustrating an example of the structure of the moving unit according to Embodiment 6.

FIGS. 15A and 15B are diagrams for illustrating an example of the structure of the moving unit 20. As shown in FIG. 15A, the moving unit 20 comprises a pushing portion 21 and a restricting portion 23. FIG. 15A is a sectional view of the sheet storage apparatus 1, taken along a plane including the up and down direction and the slide direction.

The pushing portion 21 pushes the sheets 500 supplied from outside the moving unit 20, from the inside of the moving unit 20 to the inside of the storage bag 600 attached to the attachment unit 10. The storage direction is, for example, substantially the same direction as the slide direction by the first slide unit 30.

The pushing portion 21 is moveable in the storage direction. When the pushing portion 21 moves from the moving unit 20 side to the attachment unit 10 side, the sheets 500 are pushed by the distal end of the pushing portion 21 and pushed to the inside of the storage bag 600. At this time, the sheets 500 are pushed by the pushing portion 21 while being in an upright position. FIG. 13 shows a state where the sheets 500 are pushed by the pushing portion 21 and are in process of being stored in the storage bag 600.

Thus, the sheets 500 are stacked and stored inside the storage bag 600 while being in an upright position. When the sheets 500 are pushed to the far side of the storage bag 600, the pushing portion 21 is returned to an initial position inside the moving unit 20. The initial position of the pushing portion 21 is, for example, a position on the outermost side in the storage direction, that is, a position at which the distal end of the pushing portion 21 is farthest from the attachment unit 10, in the movable region of the pushing portion 21.

The distal end of the pushing portion 21 on the side close to the attachment unit 10 is formed in a shape by which the sheets 500 in an upright position can be efficiently pushed as will be described later.

The restricting portion 23 is provided near the boundary between the moving unit 20 and the attachment unit 10 and restricts movement of the sheets 500 inside the moving unit 20 to the inside of the storage bag 600. The restricting portion 23 supports banknotes stored in the storage bag 600 between the restricting portion 23 and the stage 15. When the sheets 500 are not moved to the storage bag 600 by the pushing portion 21, the restricting portion 23 restricts movement of the sheets 500 to prevent the sheets 500 from unintentionally entering the inside of the storage bag 600. When the sheets 500 are moved to the storage bag 600 by the pushing portion 21, the restricting portion 23 cancels restrictions.

As shown in FIG. 15A, the restricting portion 23 comprises an up and down split structure. The upper part of the restricting portion 23 is configured to be moveable upward. The lower part of the restricting portion 23 is configured to be moveable downward. Thus, the restricting portion 23 is openable and closeable. FIG. 15A shows the position of the restricting portion 23 in a closed state by the continuous line and shows the position of the restricting portion 23 in an open state by the dashed line. With such a configuration, the restricting portion 23 in a closed state is capable of efficiently restricting unintentional entry of the sheets 500 in an upright position to the inside of the storage bag 600 and in an open state permits movement of the sheets 500 by the pushing portion 21.

FIG. 15B is a diagram for illustrating the structures of the pushing portion 21 and the restricting portion 23 in more detail. FIG. 15B is a view of the structure of the end of the moving unit 20 from the attachment unit 10 side.

As shown in FIG. 15B, the restricting portion 23 is formed in a comb tooth shape comprising a gap. As shown in FIG. 15B, the pushing portion 21 is formed in a grid shape in which the pushing portion 21 can pass through the gap of the restricting portion 23 in a closed state. With such a configuration, the pushing portion 21 is capable of efficiently pushing the sheets 500 in an upright position and, regardless of the open/closed state of the restricting portion 23, is moveable between the inside of the moving unit 20 and the inside of the attachment unit 10.

In the sheet storage apparatus 1, when movement of the sheets 500 to the inside of the storage bag 600 by the pushing portion 21 completes in a state where the restricting portion 23 is open to cancel restrictions, the restricting portion 23 closes to resume restrictions while being in a state where the pushing portion 21 remains inside the storage bag 600. Thus, it is possible to efficiently prevent the sheets 500 stored in the storage bag 600 from returning to the inside of the moving unit 20. Since the pushing portion 21 is formed in such a shape that the pushing portion 21 can pass through the gap of the restricting portion 23 in a closed state as shown in FIG. 15B, the pushing portion 21 is returnable to the inside of the moving unit 20 in this state as well.

With such a configuration, even when, for example, there occurs an operation error that the distal end of the pushing portion 21 is not returnable to the initial position in a state of entering the inside of the storage bag 600, the attachment unit 10 and the moving unit 20 cannot be separated by moving the attachment unit 10 or the moving unit 20 while the pushing portion 21 is fixed. Thus, the operator can easily access the pushing portion 21 where an operation error has occurred, so it is easy to eliminate the operation error.

Embodiment 7

In Embodiment 7, the sheet handling apparatus 100 comprising the sheet storage apparatus 1 according to the above-described Embodiments will be described.

The sheet handling apparatus 100 is an apparatus comprising a handling unit that performs various processes, such as a deposit process of depositing sheets and a withdrawal process of withdrawing sheets, by controlling the mechanisms in the apparatus. In the following description, a side where a receiving unit 103 (described later) of the sheet handling apparatus 100 is disposed is defined as front, and the opposite side is defined as rear. A horizontal direction orthogonal to the front and rear direction is defined as right and left direction.

Figure 16:
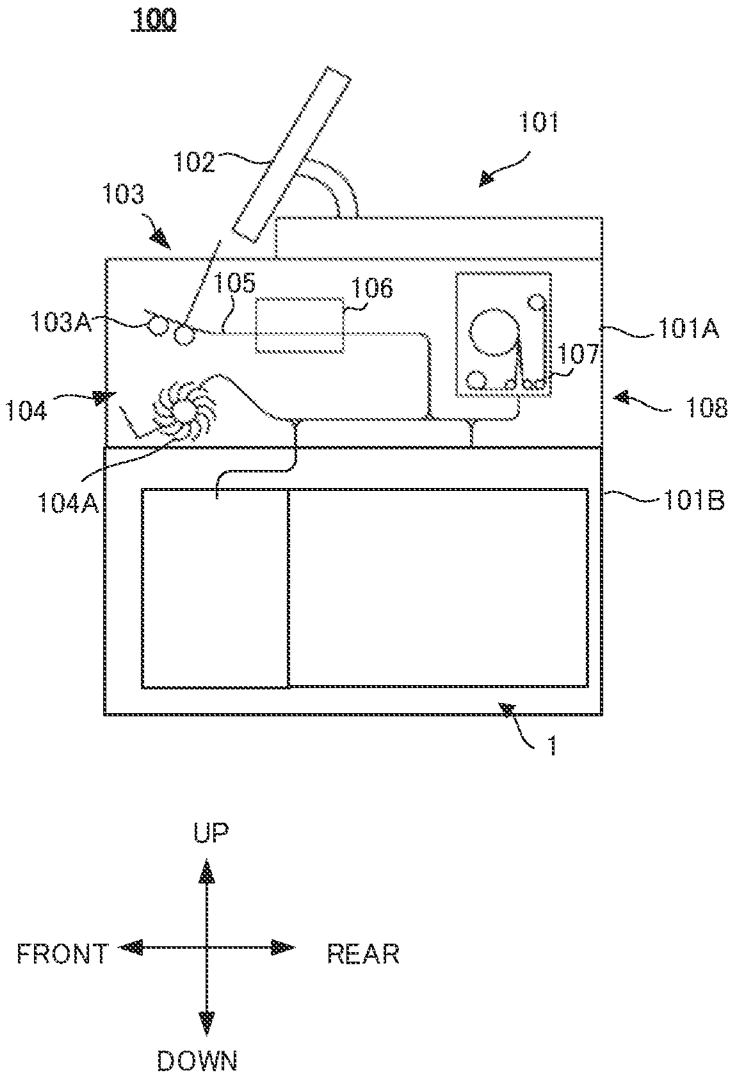
FIG. 16 is a diagram for illustrating the configuration of a sheet handling apparatus according to Embodiment 7.

As shown in FIG. 16, the sheet handling apparatus 100 comprises a casing 101 having substantially a rectangular parallelepiped shape. An upper unit 101A and a lower unit 101B are accommodated inside the casing 101.

The upper unit 101A comprises a handling unit 108 made up of an operation unit 102, the receiving unit 103, an outlet section 104, a transport unit 105, a recognition unit 106, and a storage feeding unit 107.

The operation unit 102 is provided above the casing 101. The operation unit 102 receives an operation performed by the operator of the sheet handling apparatus 100. The sheet handling apparatus 100 performs various processes in accordance with an operation of the operator on the operation unit 102. The operation unit 102 may be, for example, a touch panel laminated on a display, such as a liquid crystal display. In this case, the display shows a screen prompting the operator to select a process to be performed by the sheet handling apparatus 100, a screen indicating the amount (sheets, total price, or the like) of the sheets 500 stored in the sheet handling apparatus 100, or the like.

The receiving unit 103 is provided at the front upper part of the casing 101. The receiving unit 103 comprises a receiving hopper or the like for inserting banknotes from the outside of the casing 101 to the inside of the casing 101. The outlet section 104 for delivering banknotes from the inside of the casing 101 to the outside of the casing 101 is provided below the receiving unit 103.

The receiving unit 103 receives a sheet group consisting of one or more sheets, set by the operator. The receiving unit 103 comprises a feeding mechanism 103A for feeding sheets of a sheet group one by one to the inside of the casing 101. Sheets fed one by one from the feeding mechanism 103A are transported one by one by the transport unit 105.

The recognition unit 106 is provided in a transport path that is a component of the transport unit 105. The recognition unit 106 recognizes the denomination, authenticity, face/back, fitness, new/old, transport condition, and the like of each sheet transported by the transport unit 105.

The storage feeding unit 107 (temporary storage unit) is provided downstream of the recognition unit 106 in the transport unit 105. The storage feeding unit 107 temporarily stores sheets transported from the transport unit 105 and feeds the stored sheets one by one to the transport unit 105. Thus, banknotes stored in the storage feeding unit 107 are capable of being transported from the storage feeding unit 107 to the sheet storage apparatus 1 provided in the lower unit 101B. The storage feeding unit 107 is made up of, for example, a tape reel feeding unit.

The outlet section 104 is connected to the transport unit 105. In a withdrawal process or the like of the sheet handling apparatus 100, sheets in the amount needed by the transport unit 105 are temporarily stacked in the outlet section 104. The outlet section 104 allows access from outside the casing 101. The operator can take out the sheets stacked in the outlet section 104 from the front of the casing 101.

A stacking wheel 104A is provided at a connecting point with the outlet section 104 in the transport unit 105. With the rotation of the stacking wheel 104A, sheets held between the vanes of the stacking wheel 104A are stacked in the outlet section 104.

The handling unit 108 comprising the above-described components performs various processes, such as a deposit process and a withdrawal process, on sheets received from the receiving unit 103. A deposit process is a process to store received sheets in the storage feeding unit 107 or the sheet storage apparatus 1. A withdrawal process is a process to withdraw sheets from the storage feeding unit 107 to the outlet section 104.

Figure 17:
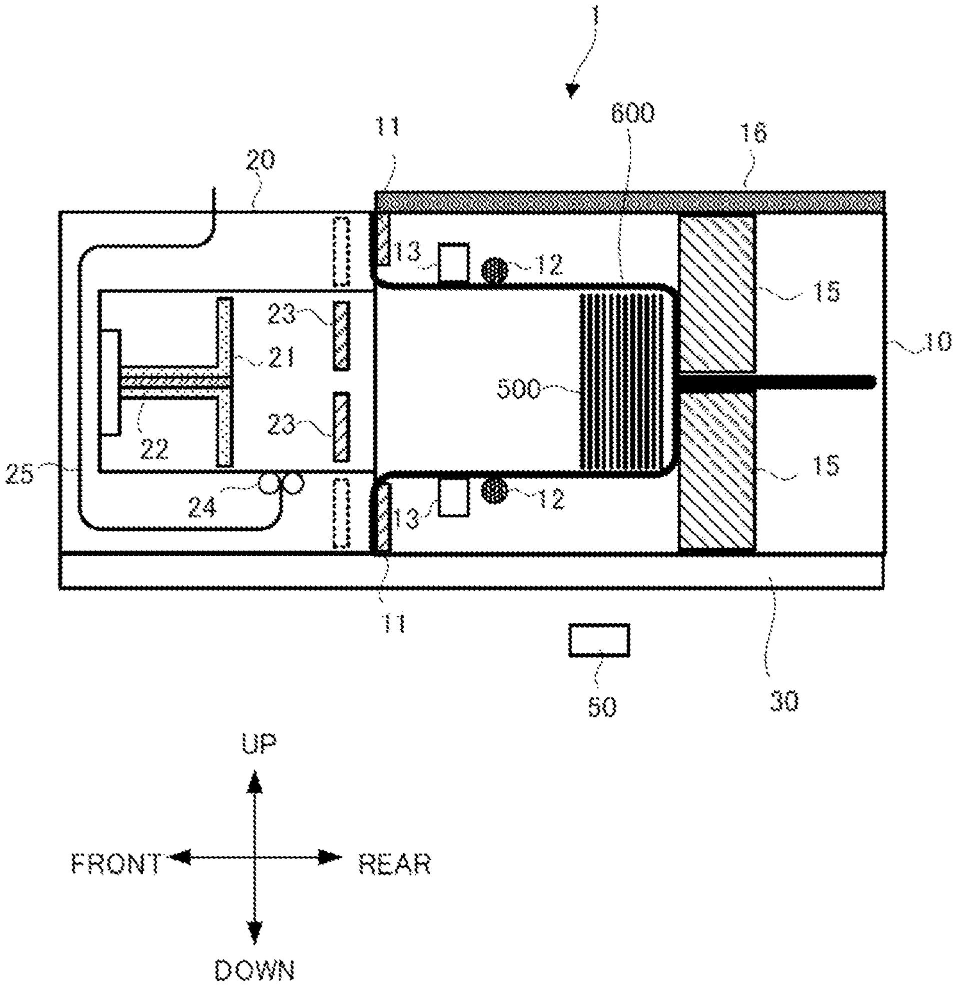
FIG. 17 is a diagram for illustrating the configuration of a sheet storage apparatus according to Embodiment 7.

The sheet storage apparatus 1 is provided in the lower unit 101B. FIG. 17 is a diagram showing the overall configuration of the sheet storage apparatus 1. In the sheet storage apparatus 1, the storage bag 600, such as a pouch bag, is attached in a horizontal orientation, and sheets are stacked and stored in an upright position. An upright position of sheets is a position in which the surface and back surface of each sheet face a direction perpendicular to the up and down direction.

As shown in FIG. 17, the sheet storage apparatus 1 comprises the attachment unit 10, the moving unit 20, the first slide unit 30, and the control unit 50. In the example shown in FIG. 17, the storage bag 600 is attached such that the entrance faces the front side of the sheet handling apparatus 100; however, the present disclosure is not limited thereto. For example, the entrance of the storage bag 600 may face the left side, right side, back side, or in another direction perpendicular to the up and down direction, of the sheet handling apparatus 100. In other words, the right side in FIG. 17 corresponds to the front side of the sheet storage apparatus 1, and the left side in FIG. 17 corresponds to the rear side of the sheet storage apparatus 1. In FIG. 17, a direction from the front side of the sheet storage apparatus 1 toward the back side of the sheet storage apparatus 1 is the same direction as the storage direction and the slide direction in the above-described Embodiments.

The attachment unit 10 is a unit to which the storage bag 600 is attached and that has been described in the above-described Embodiment 5. The moving unit 20 is a unit that moves the sheets 500 transported by the transport unit 105 in the storage direction while being in an upright position and stores the sheets 500 to the inside of the storage bag 600, and that has been described in the above-described Embodiment 6.

The first slide unit 30 is a unit that slides the attachment unit 10 to outside the casing 101 of the sheet handling apparatus 100, as in the case of the above-described Embodiments 1 to 6. Each of the front, rear, right, and left wall faces of the lower unit 101B comprises an openable and closable door. The operator can draw the attachment unit 10 to outside of the casing 101 through an open door by the first slide unit 30. Therefore, the operator can easily perform work for attaching or removing the storage bag 600 to or from the attachment unit 10. The first slide unit 30 is, for example, a slide rail member. In the example shown in FIG. 17, the first slide unit 30 is provided in the front and rear direction, and the attachment unit 10 can be drawn from the door provided on the front side or back side of the casing 101. The first slide unit 30 may be configured to slide the moving unit 20 together with the attachment unit 10. In this case, as in the case of the above-described Embodiment 3, in addition to the first slide unit 30 that slides the attachment unit 10, the second slide unit 40 that moves the moving unit 20 may be provided.

An operation example of the sheet storage apparatus 1 will be described with reference to FIGS. 18 to 30. FIGS. 18 to 23 are diagrams showing the operation of the sheet storage apparatus 1 step by step in the case where a predetermined number of sheets are stored in the storage bag 600. In FIGS. 18 to 23, a closing unit 12 and a sealing unit 13 that will not appear in the description are not shown.

Figure 18:
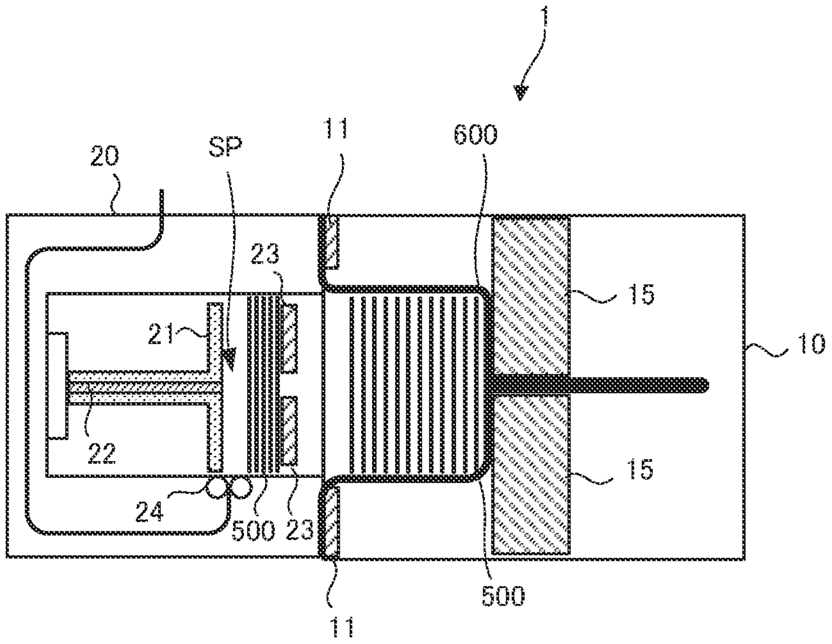
FIG. 18 is a diagram for illustrating an operation example when the sheet storage apparatus stores sheets according to Embodiment 7.

Initially, as shown in FIG. 18, a predetermined amount of sheets 500 is fed by the feeding unit 24 to a temporary storage unit SP that is the internal space of the moving unit 20 and is stored so as to lean against the restricting portion 23 (step S1). In the example shown in FIG. 18, a certain amount of sheets 500 is stored inside the storage bag 600 in advance, and the stage 15 of the attachment unit 10 has moved to a position appropriate for the amount of sheets 500 stored.

Figure 19:
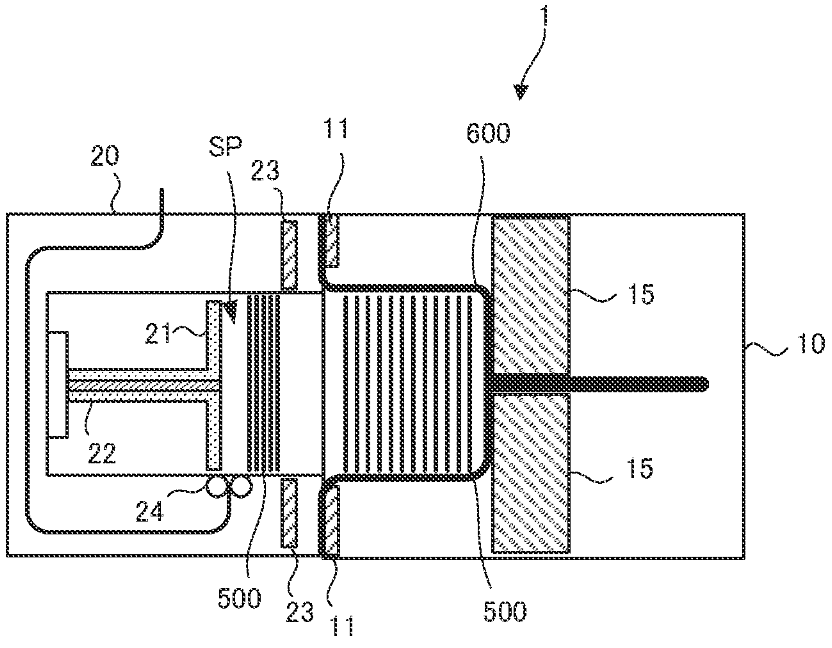
FIG. 19 is a diagram for illustrating an operation example when the sheet storage apparatus stores sheets according to Embodiment 7.

As shown in FIG. 19, when the predetermined amount of sheets 500 is stored, the restricting portion 23 is opened (step S2).

Figure 20:
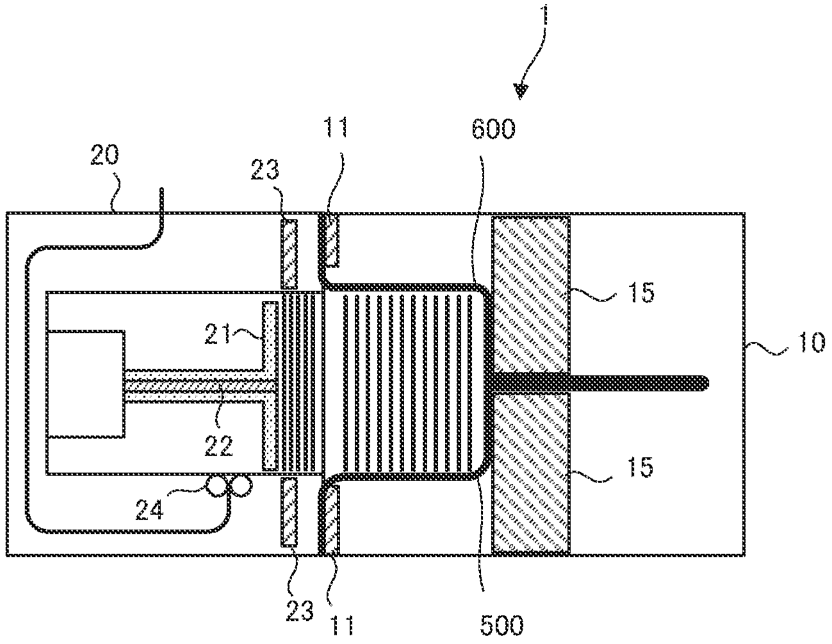
FIG. 20 is a diagram for illustrating an operation example when the sheet storage apparatus stores sheets according to Embodiment 7.

As shown in FIG. 20, when the restricting portion 23 is opened, the pushing portion 21 pushes the sheets 500 toward the far side in the storage direction to move the sheets 500 to the inside of the storage bag 600 (step S3). When the restricting portion 23 is opened, the sheets 500 stored so as to lean against the restricting portion 23 are temporarily retained by the sheets 500 stored inside the storage bag 600 in advance, and do not fall down. When there is no sheet 500 inside the storage bag 600, that is, for example, when the sheets 500 are stored in the storage bag 600 newly attached to the attachment unit 10 for the first time, the stage 15 moves to the outermost side in the storage direction, with the result that the sheets 500 do not fall down even when the restricting portion 23 is opened.

Figure 21:
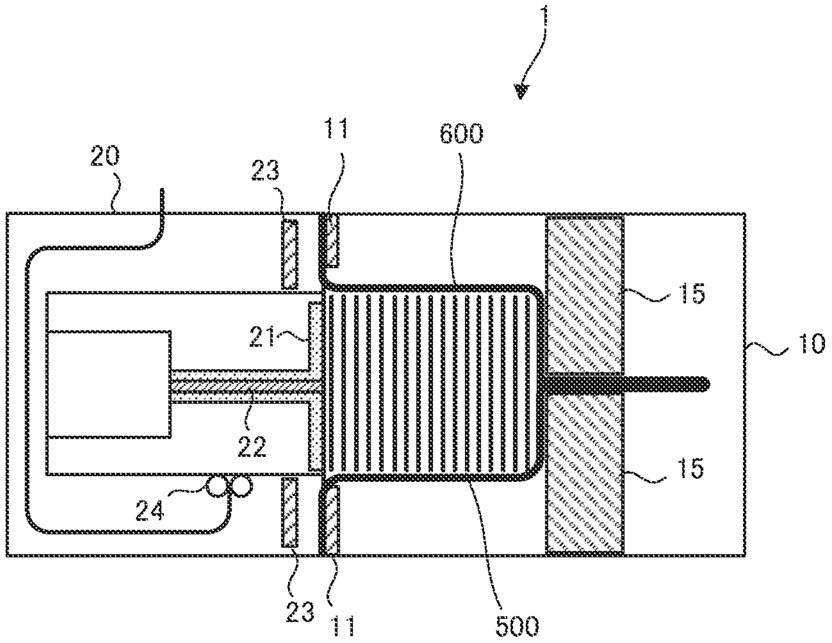
FIG. 21 is a diagram for illustrating an operation example when the sheet storage apparatus stores sheets according to Embodiment 7.

Movement of the pushing portion 21 toward the far side in the storage direction continues until the distal end of the pushing portion 21 reaches a predetermined storage position. FIG. 21 shows a state where the distal end of the pushing portion 21 has reached the storage position. When the distal end of the pushing portion 21 cannot reach the storage position due to the thickness of the sheets 500 stored inside the storage bag 600, the stage 15 moves toward the far side in the storage direction to cause the distal end of the pushing portion 21 to reach the storage position as shown in FIG. 21 (step S4).

After the position of the distal end of the pushing portion 21 in the storage direction becomes the predetermined storage position, driving force to move the pushing portion 21 toward the far side in the storage direction is continuously supplied. Thus, the sheets 500 are compressed by the pushing portion 21 inside the storage bag 600. The predetermined storage position is, for example, a position slightly on the far side in the storage direction with respect to the restricting portion 23.

Figure 22:
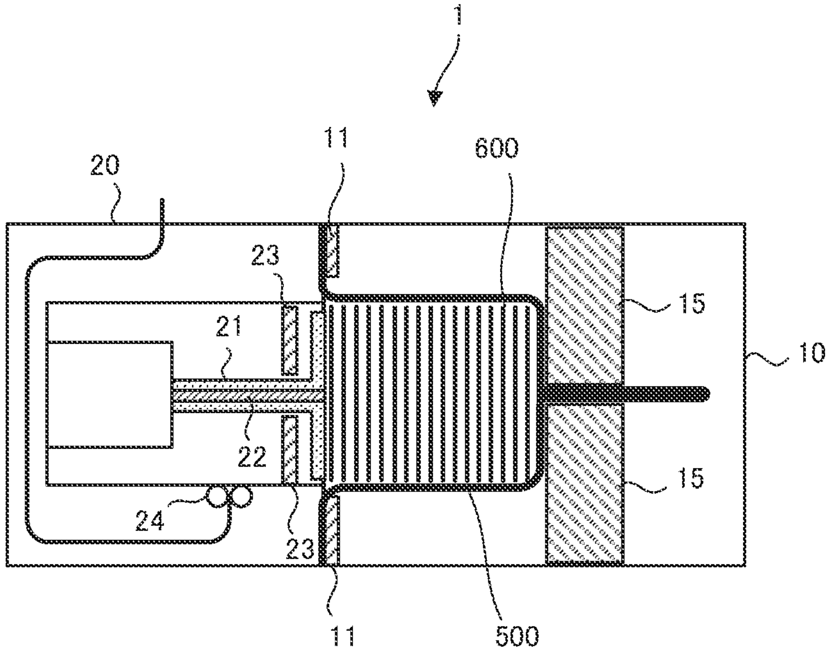
FIG. 22 is a diagram for illustrating an operation example when the sheet storage apparatus stores sheets according to Embodiment 7.

After the position of the distal end of the pushing portion 21 in the storage direction becomes the predetermined storage position, supply of driving force to the pushing portion 21 is stopped, and the position of the pushing portion 21 in the storage direction is fixed. In this state, as shown in FIG. 22, the restricting portion 23 is closed (step S5).

Figure 23:
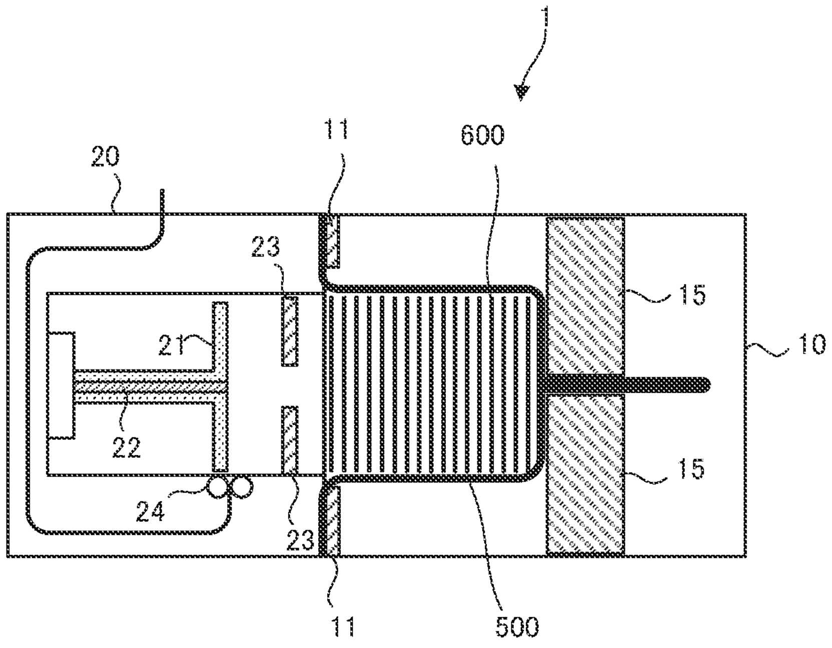
FIG. 23 is a diagram for illustrating an operation example when the sheet storage apparatus stores sheets according to Embodiment 7.

As shown in FIG. 23, when the restricting portion 23 is closed, the entire pushing portion 21 is returned toward the outer side in the storage direction through the gap of the restricting portion 23 (step S6). Thus, inside the storage bag 600, the sheets 500 that have lost compression force from the pushing portion 21 attempts to return toward the outer side in the storage direction; however, the sheets 500 are not returnable to inside the moving unit 20 due to the restricting portion 23. Thus, storage of sheets in the storage bag 600 completes.

Figure 24:
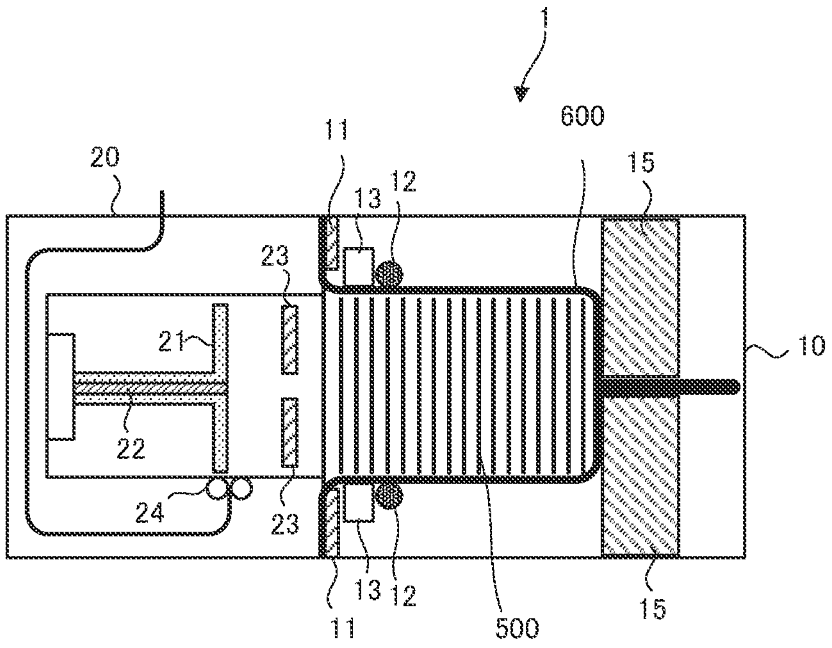
FIG. 24 is a diagram for illustrating an operation example when the sheet storage apparatus seals a storage bag according to Embodiment 7.

FIGS. 24 to 30 are diagrams showing the operation of the sheet storage apparatus 1 step by step in the case where the storage bag 600 is sealed in a state where a predetermined amount of sheets 500 is stored in the storage bag 600. FIG. 24 shows a state where a predetermined amount of sheets 500 is stored inside the storage bag 600 (step S11).

Figure 25:
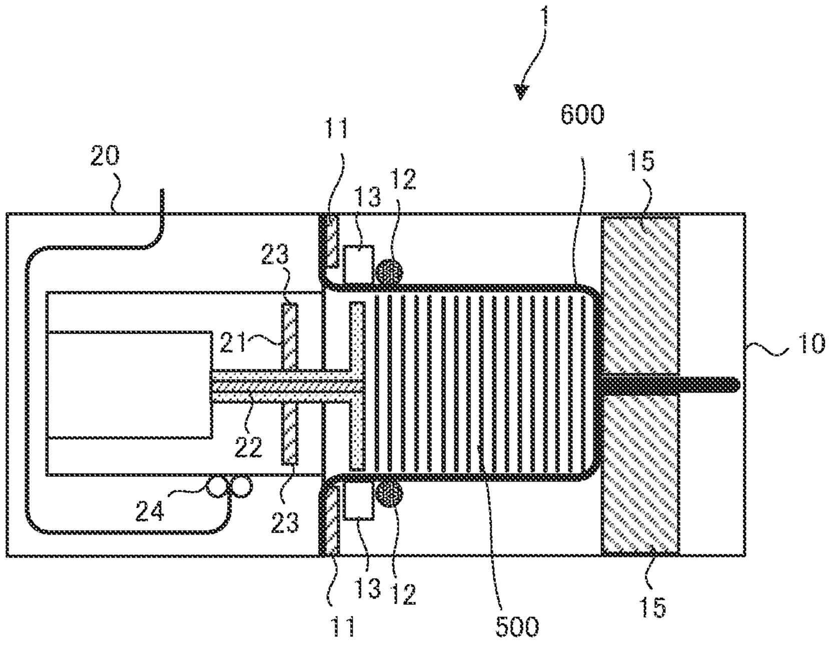
FIG. 25 is a diagram for illustrating an operation example when the sheet storage apparatus seals the storage bag according to Embodiment 7.

Initially, as shown in FIG. 25, the pushing portion 21 and a retaining portion 22 integrally move toward the far side in the storage direction while the restricting portion 23 remains in a closed state (step S12). Thus, the sheets 500 are stored inside the storage bag 600 are compressed by the pushing portion 21 and the stage 15.

Figure 26:
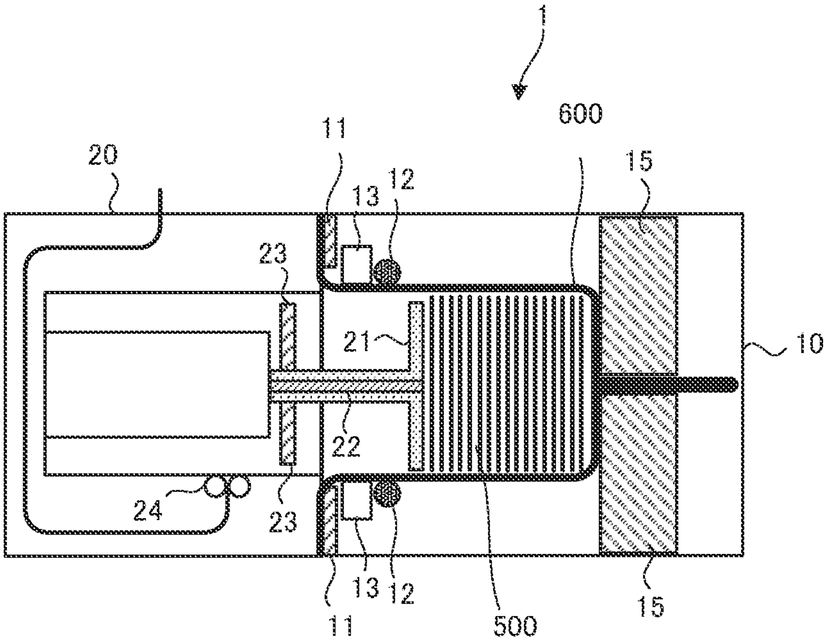
FIG. 26 is a diagram for illustrating an operation example when the sheet storage apparatus seals the storage bag according to Embodiment 7.

Movement of the pushing portion 21 and the retaining portion 22 toward the far side in the storage direction continues until the distal end of the pushing portion 21 reaches a predetermined sealing position. When the distal end of the pushing portion 21 cannot reach the sealing position due to the thickness of the sheets 500 stored inside the storage bag 600, the stage 15 moves toward the far side in the storage direction to cause the distal end of the pushing portion 21 to reach the sealing position (step S13). FIG. 26 shows a state where the distal end of the pushing portion 21 has reached the sealing position. The predetermined sealing position is a position on the far side in the storage direction with respect to the sealing unit 13 and the closing unit 12.

Figure 27:
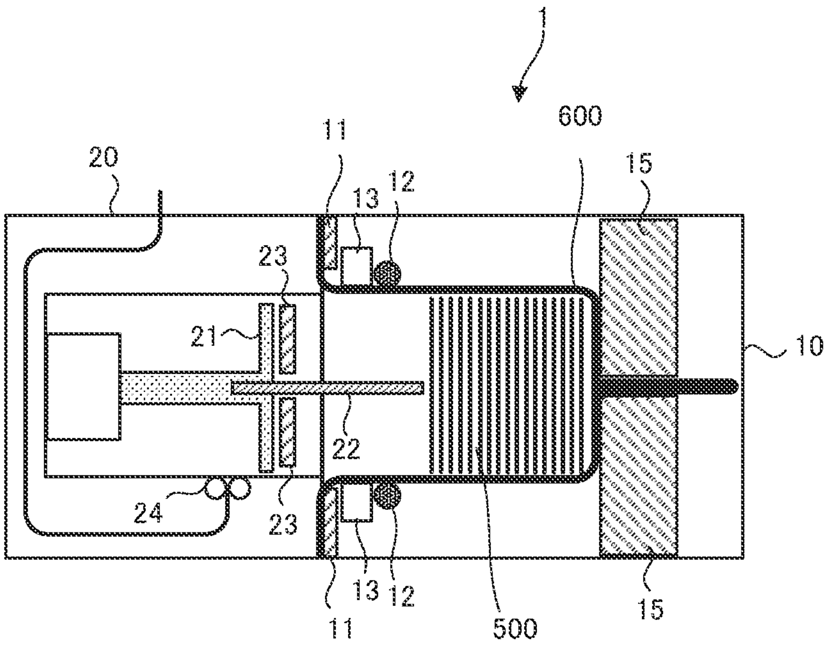
FIG. 27 is a diagram for illustrating an operation example when the sheet storage apparatus seals the storage bag according to Embodiment 7.

When the distal end of the pushing portion 21 has reached the sealing position, the distal end of the retaining portion 22 is fixed in the sealing position, and the entire pushing portion 21 is returned to the inside of the moving unit 20, as shown in FIG. 27 (step S14). Thus, the sheets 500 are retained by the retaining portion 22. In step S14, the pushing portion 21 may return to the initial position of the pushing portion 21 or may stop at a selected position on the far side in the storage direction with respect to the initial position in the moving unit 20.

Figure 28:
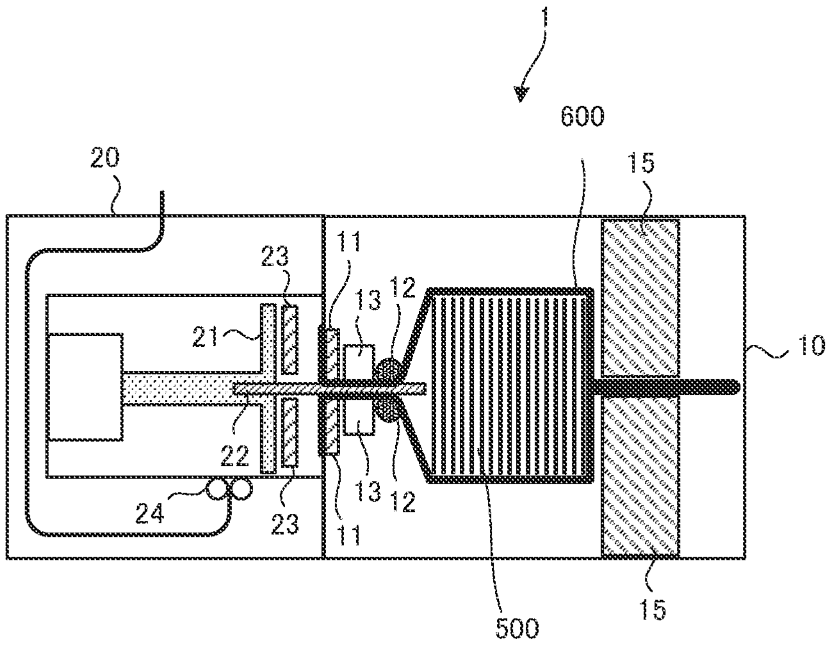
FIG. 28 is a diagram for illustrating an operation example when the sheet storage apparatus seals the storage bag according to Embodiment 7.
Figure 29:
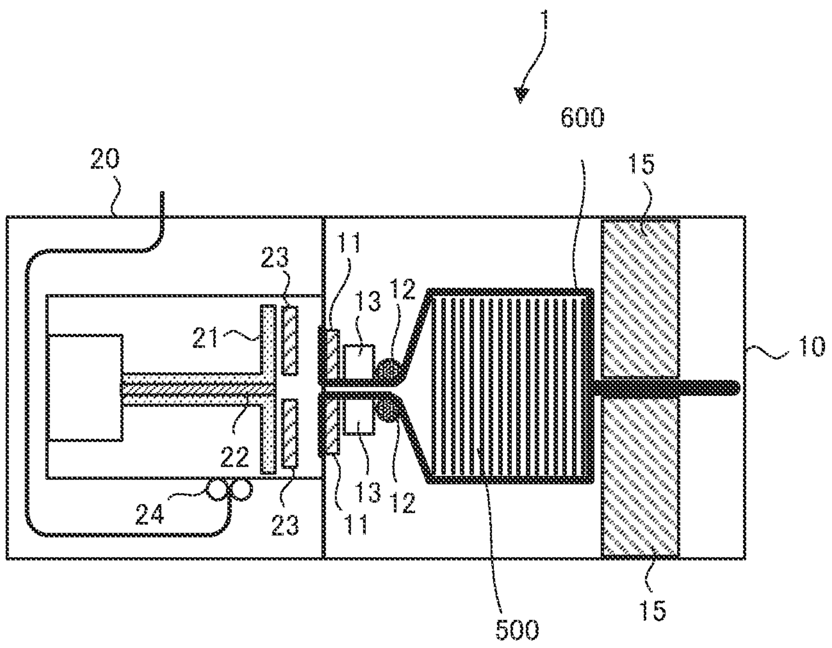
FIG. 29 is a diagram for illustrating an operation example when the sheet storage apparatus seals the storage bag according to Embodiment 7.

As shown in FIG. 28, in a state where the retaining portion 22 retains the sheets 500, the closing unit 12 closes the storage bag 600 (step S15). As shown in FIG. 29, in a certain closed state, the entire retaining portion 22 is returned to the inside of the moving unit 20 (step S16). Since the retaining portion 22 is returned in a state where the storage bag 600 is closed to some extent, the sheets 500 are retained by the inner surface of the storage bag 600 instead of the retaining portion 22. Therefore, the sheets 500 do not fall down. The pushing portion 21 and the retaining portion 22 are returned to the initial position, that is, a position on the outermost side in the storage direction in the movable region of the pushing portion 21 and the retaining portion 22.

Figure 30:
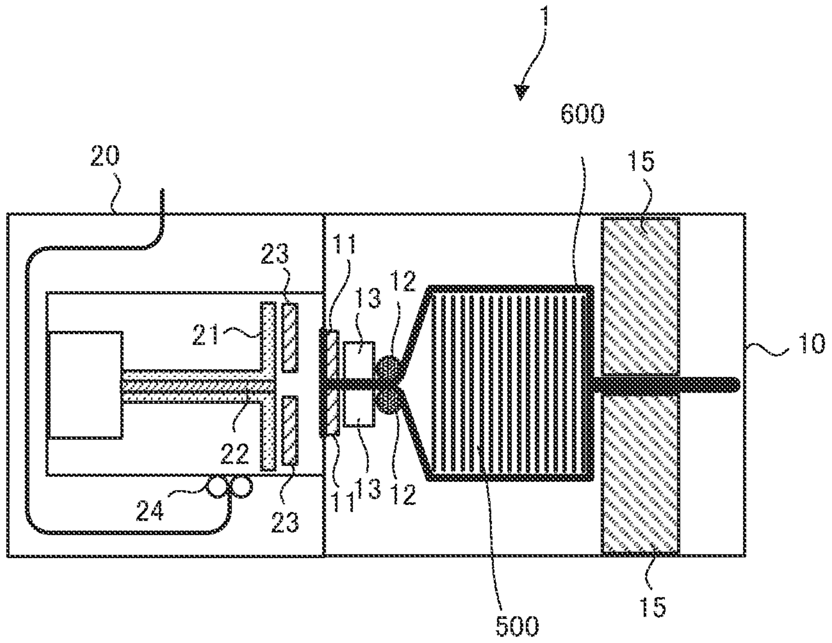
FIG. 30 is a diagram for illustrating an operation example when the sheet storage apparatus seals the storage bag according to Embodiment 7.

Subsequently, as shown in FIG. 30, the closing unit 12 completely closes the storage bag 600, and the sealing unit 13 seals the entrance portion of the storage bag 600 (step S17). Thus, sealing of the storage bag 600 completes.

When sealing of the storage bag 600 completes, the operator draws the attachment unit 10 to outside the casing 101 by the first slide unit 30 shown in FIG. 18. Thus, the operator can remove the storage bag 600, in which the sheets 500 are stored and sealed, from the attachment unit 10 and attach a new storage bag 600 to the attachment unit 10.

What is claimed is:

1. A sheet storage apparatus comprising:

an attachment unit comprising an attachment portion to which a storage bag for sheets is attached;

a moving unit configured to move the sheets toward an inside of the storage bag;

a first slide unit configured to slide at least any one of the attachment unit and the moving unit such that a relative position between the attachment unit and the moving unit is changed between a first position in which the attachment portion is covered with the moving unit and a second position in which the attachment portion is exposed to allow attaching or removing of the storage bag;

wherein the sheet storage apparatus is provided inside a sheet handling apparatus; and a second slide unit configured to slide the attachment unit and the moving unit to outside the sheet handling apparatus.

2. The sheet storage apparatus according to claim 1, wherein the first slide unit slides, to set the relative position to the second position, at least any one of the attachment unit and the moving unit which have been slid by the second slide unit to outside the sheet handling apparatus in a state where the relative position is the first position.

3. The sheet storage apparatus according to claim 2, wherein a direction of sliding by the first slide unit and a direction of sliding by the second slide unit are opposite to each other.

4. The sheet storage apparatus according to claim 2, wherein a direction of sliding by the first slide unit and a direction of sliding by the second slide unit are the same direction.

5. The sheet storage apparatus according to claim 1, wherein the attachment portion comprises an attachment pin that is fitted into a hole of the storage bag to attach the storage bag.

6. The sheet storage apparatus according to claim 1, further comprising an engagement mechanism configured to engage the attachment unit with the moving unit to lock the attachment unit to the moving unit.

7. A sheet handling apparatus comprising:

a receiving unit configured to receive sheets;

a handling unit configured to perform a predetermined process on the sheets; and the sheet storage apparatus according to claim 1.

8. A sheet storage apparatus comprising:

an attachment unit comprising an attachment portion to which a storage bag for sheets is attached;

a moving unit configured to move the sheets toward an inside of the storage bag;

a first slide unit configured to slide at least any one of the attachment unit and the moving unit such that a relative position between the attachment unit and the moving unit is changed between a first position in which the attachment portion is covered with the moving unit and a second position in which the attachment portion is exposed to allow attaching or removing of the storage bag;

a detection unit configured to detect an operation error of the sheet storage apparatus; and a limiting unit configured to limit sliding by the first slide unit, when the operation error has been detected by the detection unit.

9. The sheet storage apparatus according to claim 8, wherein the limiting unit limits sliding by the second slide unit, when the operation error has not been detected by the detection unit, and the first slide unit changes the relative position to the second position by sliding the attachment unit to outside the sheet handling apparatus in a state where sliding by the second slide unit is limited.

10. The sheet storage apparatus according to claim 8, wherein the attachment unit further comprises an opening configured to allow the storage bag attached to the attachment portion to be exposed.

11. The sheet storage apparatus according to claim 10, wherein the attachment unit further comprises a stage configured to retain the sheets stored in the storage bag, and the opening allows the stage to be exposed.

12. The sheet storage apparatus according to claim 10, wherein the attachment unit further comprises a lid configured to close the opening.

13. A sheet storage apparatus comprising:

an attachment unit comprising an attachment portion to which a storage bag for sheets is attached;

a moving unit configured to move the sheets toward an inside of the storage bag; and a first slide unit configured to slide at least any one of the attachment unit and the moving unit such that a relative position between the attachment unit and the moving unit is changed between a first position in which the attachment portion is covered with the moving unit and a second position in which the attachment portion is exposed to allow attaching or removing of the storage bag, wherein the moving unit comprises a pushing portion configured to push the sheets to be moved in a direction toward an inside of the storage bag attached to the attachment portion, and a restricting portion configured to restrict movement of the sheets by the pushing portion toward the inside of the storage bag, and comprises a gap that allows the pushing portion that moves in the direction to pass through.

* * * * *